(12) United States Patent
Lee et al.

(10) Patent No.: US 8,521,146 B2
(45) Date of Patent: Aug. 27, 2013

(54) MOBILE TERMINAL AND METHOD OF MANAGING INFORMATION IN THE SAME

(75) Inventors: Joowoo Lee, Seoul (KR); Sunghye Yoon, Busan (KR); Seungheon Han, Seoul (KR)

(73) Assignee: LG Electronics Inc., Seoul (KR)

(*) Notice: Subject to any disclaimer, the term of this patent is extended or adjusted under 35 U.S.C. 154(b) by 60 days.

(21) Appl. No.: 13/234,451

(22) Filed: Sep. 16, 2011

(65) Prior Publication Data

US 2012/0309463 A1    Dec. 6, 2012

(30) Foreign Application Priority Data

Jun. 3, 2011  (KR) .......................... 10-2011-0053782

(51) Int. Cl.
*H04M 3/00*    (2006.01)
(52) U.S. Cl.
USPC ............... 455/418; 455/414.1; 455/412.1; 455/550.1

(58) Field of Classification Search
USPC .................. 455/418, 414.1, 412.1, 550.1
See application file for complete search history.

(56) References Cited

U.S. PATENT DOCUMENTS

2010/0295803 A1* 11/2010 Kim et al. ............... 345/173
2012/0149419 A1*  6/2012 Roh ......................... 455/515

* cited by examiner

*Primary Examiner* — Nghi H Ly
(74) *Attorney, Agent, or Firm* — KED & Associates LLP

(57) ABSTRACT

A terminal includes a display, at least one storage area to store first content and second content, and a controller to identify the second content after the first content is selected and to control display information corresponding to the second content after the second content is identified. The controller identifies the second content based on a search of stored information, and the first content and the second content share at least one common feature. The terminal may also sort the first and second content based on selection from a list of options that control the display of icons or other information corresponding to the content.

21 Claims, 23 Drawing Sheets

FIG. 4
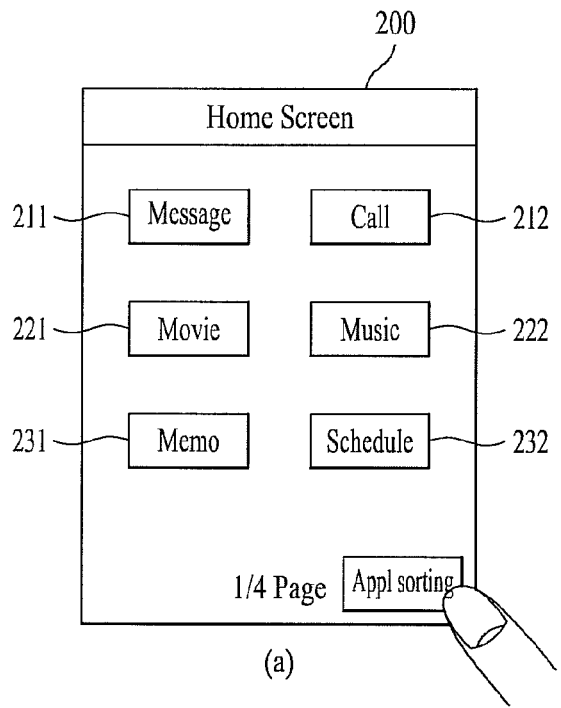
(a)
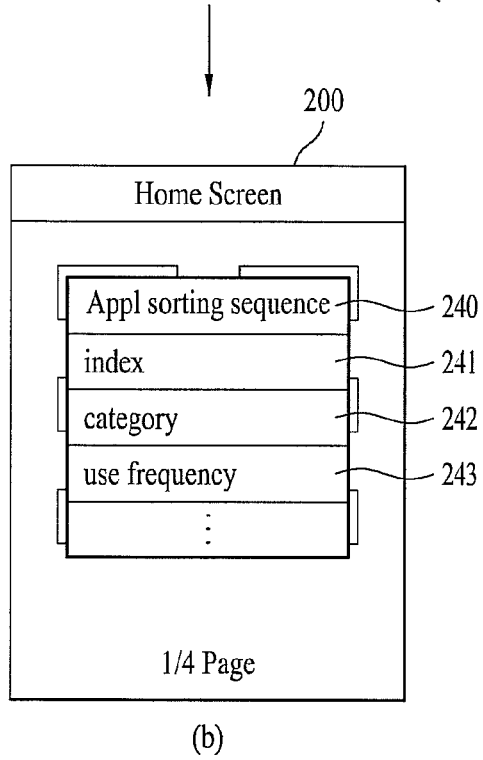
(b)

FIG. 8
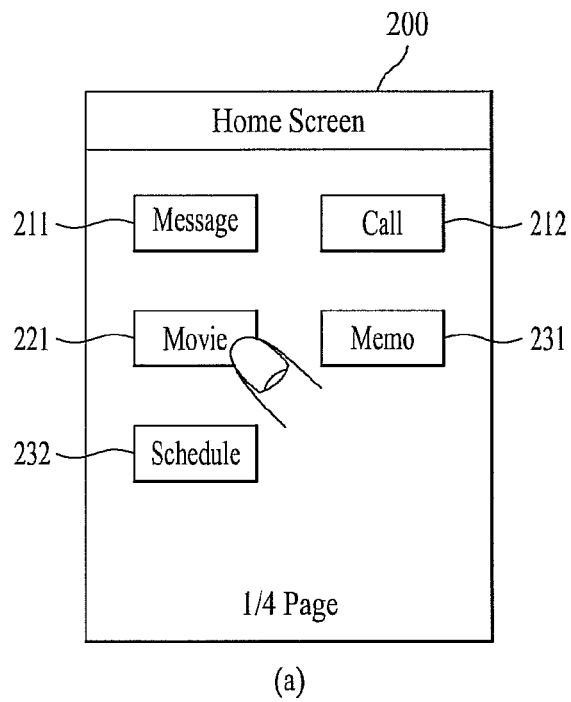
(a)
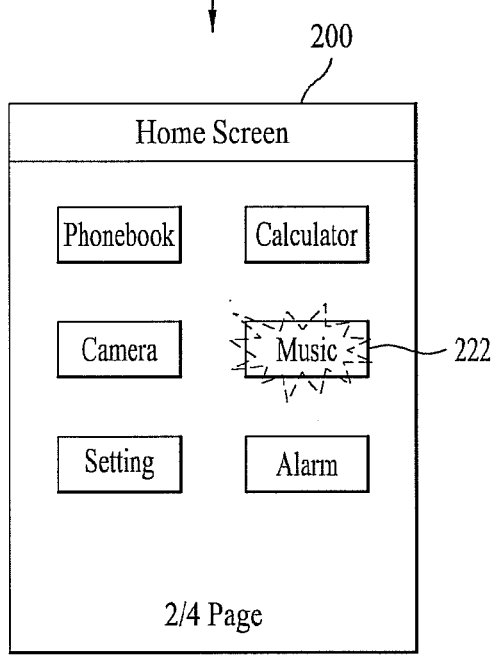
(b)

FIG. 17
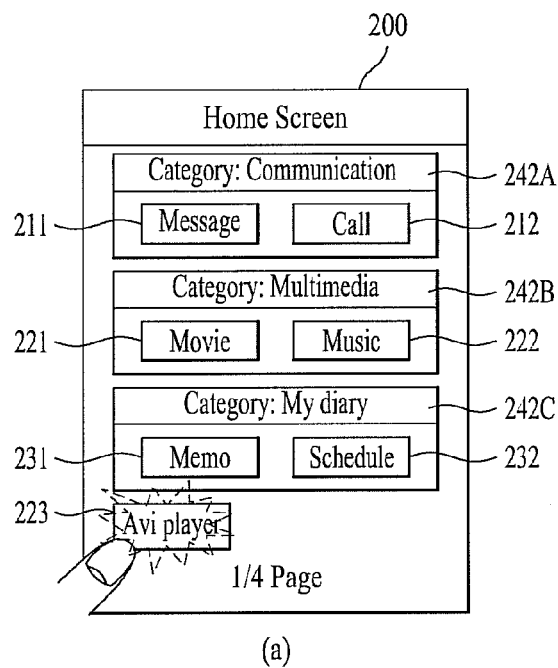
(a)
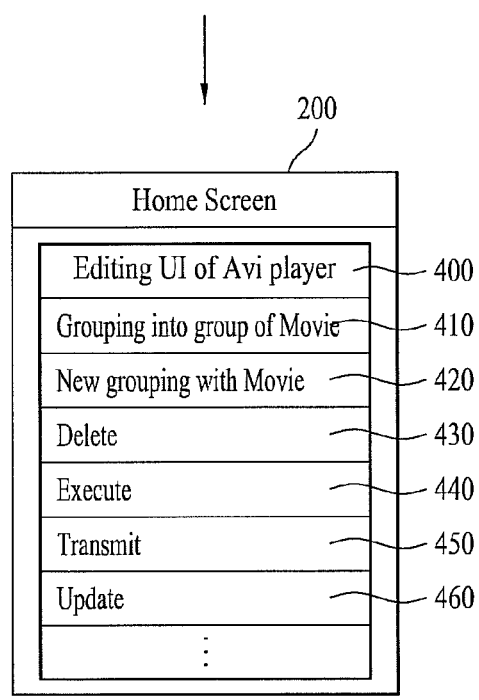
(b)

FIG. 18
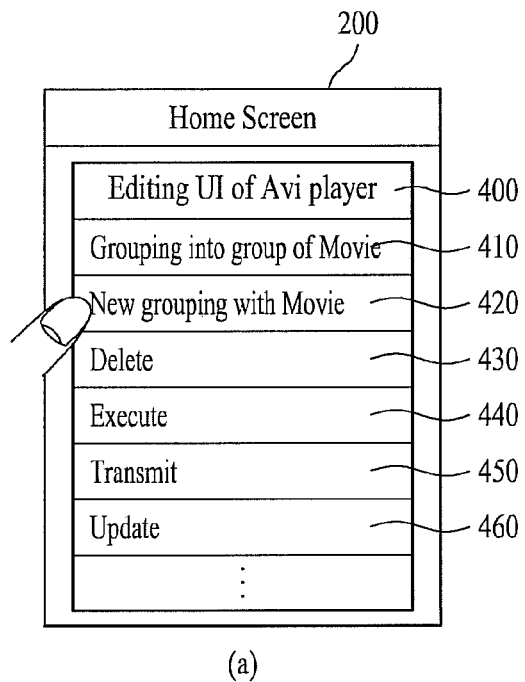
(a)
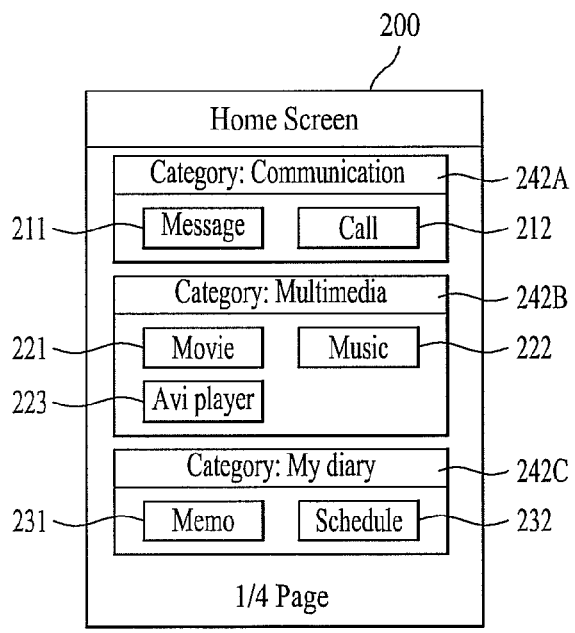
(b)

FIG. 20
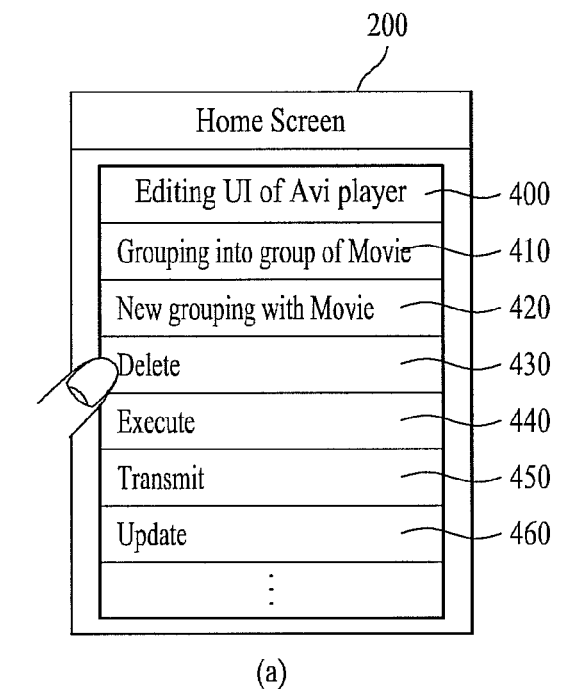
(a)
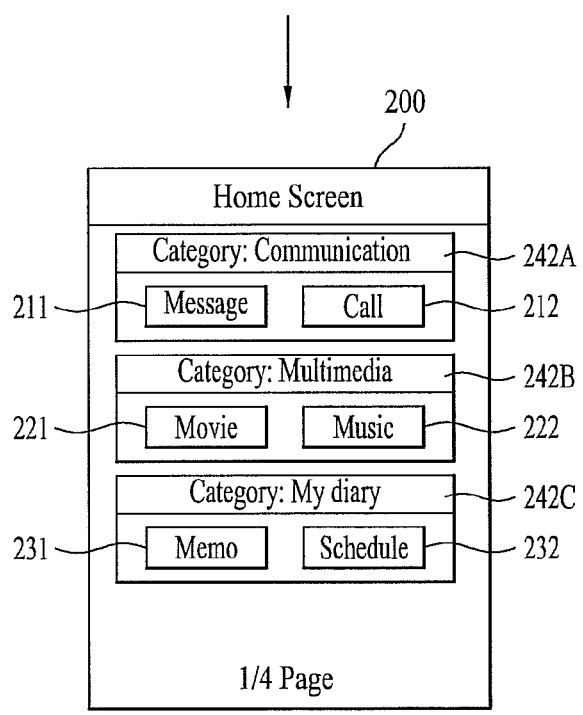
(b)

FIG. 21
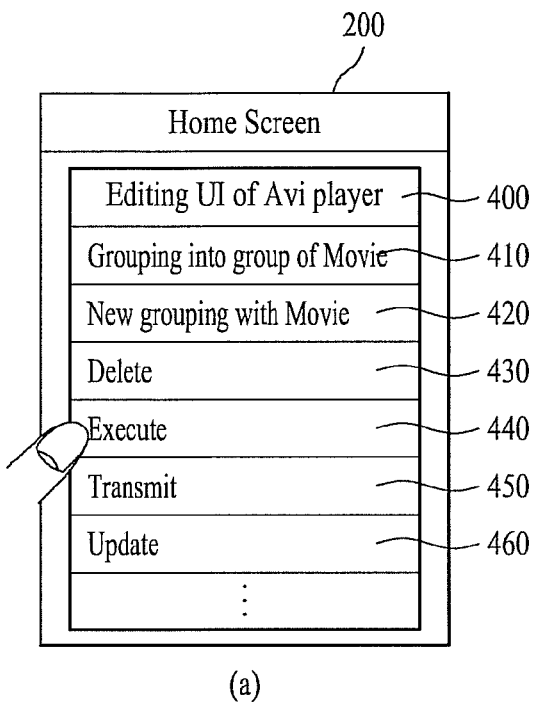
(a)
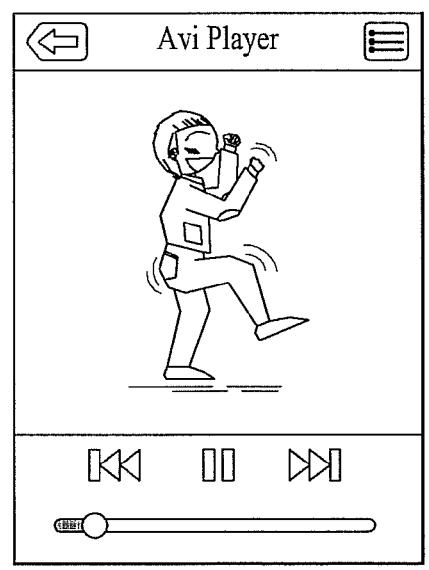
(b)

MOBILE TERMINAL AND METHOD OF MANAGING INFORMATION IN THE SAME

CROSS-REFERENCE TO RELATED APPLICATIONS

This application claims the benefit of the Korean Patent Application No. 10-2011-0053782, filed on Jun. 3, 2011, which is hereby incorporated by reference as if fully set forth herein.

BACKGROUND

1. Field

One or more embodiments described herein relate to managing information in a terminal.

2. Background

Mobile terminals perform a variety of functions, not the least of which include receiving broadcast and multicast signals including video downloads, streams and television programs. These and other types of data consume large amounts of storage. Also, performing searches for specific stored media may be difficult to perform.

BRIEF DESCRIPTION OF THE DRAWINGS

FIGS. 4 to 23 show screens for implementing the process of FIG. 3.

DETAILED DESCRIPTION

Figure 1:
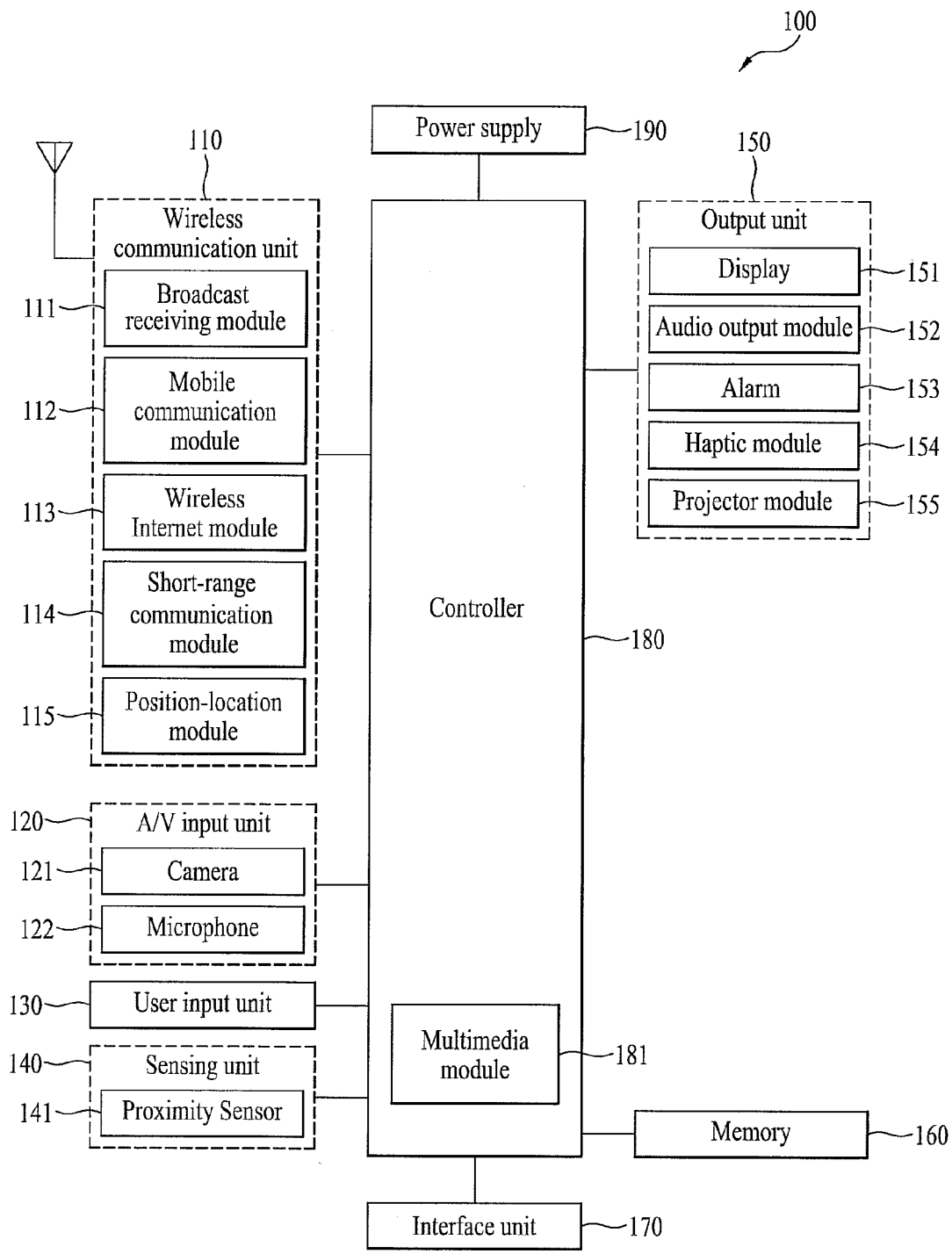
FIG. 1 shows one embodiment of a mobile terminal.

FIG. 1 shows one embodiment of a mobile terminal 100 which includes a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. More or fewer components may exist in other embodiments.

The wireless communication unit 110 includes one or more components that permit wireless communication between the mobile terminal 100 and a wireless communication system or a network within which the mobile terminal 100 is located.

For example, the wireless communication unit 110 includes a broadcast receiving module 111, a mobile communication module 112, a wireless Internet module 113, a short-range communication module 114 and a position-location module 115. For non-mobile terminals, the wireless communication unit 110 may be replaced with a wired communication unit. The wireless communication unit 110 and a wired communication unit may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The mobile terminal 100 may include at least two broadcast receiving modules 111 for providing simultaneous reception of at least two broadcast channels. The at least two broadcast receiving modules may also be used to facilitate switching of broadcast channels.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. The wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module (not shown) in non-mobile terminals. The wireless Internet module 113 and the wired Internet module may be commonly referred to as an Internet module.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The position-location module 115 identifies or otherwise obtains a location of the mobile terminal 100. The position-location module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth.

The GNSS may include: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

An example of the GNSS, the position-location module 115 is a GPS module. The position-location module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time.

Furthermore, a method of calculating position and time information using three satellites and correcting the calculated position and time information using another satellite may also used. The position-location module 115 continues to calculate a current position in real time and to calculate velocity information based on the position information.

With continued reference to FIG. 1, the audio/video (A/V) input unit 120 may be configured to provide audio or video signal input to the mobile terminal 100. The A/V input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated during the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense a presence or absence of power provided by the power supply unit 190 or a presence or absence of a coupling or other connection between the interface unit 170 and an external device. The sensing unit 140 may include a proximity sensor 141.

The output unit 150 generates output relevant to the senses of sight, hearing and touch. The output unit 150 may include a display unit 151, an audio output module 152, an alarm 153, a haptic module 154, and a projector module 155.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays.

The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). The touch controller processes the signal(s) and then transfers corresponding data to the controller 180. The controller 180 may determine, therefore, which portion of the display unit 151 is touched.

With continued reference to FIG. 1, a proximity sensor 141 can be provided within the mobile terminal 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen (touch sensor) may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touch screen.

The audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include, for example, a receiver, a speaker or a buzzer.

The alarm 153 outputs a signal for announcing an occurrence of a particular event associated with the mobile terminal 100. Typical events include a call signal reception, a message reception, a key signal input and a touch input. The alarm 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The projector module 155 is configured to perform an image projection function. More particularly, the projector module 155 is configured to display an image that is either identical to or at least partially different from the image displayed on the display unit 151 on an external screen or wall based on a control signal from the controller 180.

The projector module 155 may include a light source (not shown) configured to generate light (e.g., a laser) for projecting an image external to the mobile terminal 100, an image producing means (not shown) for producing the image for external output using the light generated from the light source, and a lens (not shown) for enlarging the image to be output externally at a predetermined focus distance. The projector module 155 may further include a device (not shown) for adjusting a direction of the projected image by mechanically moving the lens or the entire module.

The projector module 155 may be classified as, for example, a cathode ray tube (CRT) module, a liquid crystal display (LCD) module, or a digital light processing (DLP) module based on a type of a display means. In particular, the DLP module is operated by a mechanism enabling the light generated from the light source to reflect on a digital micromirror device (DMD) chip and advantageously allows the projector module 151 to be a smaller size.

The projector module 155 may be provided in a lengthwise direction of a lateral, front or rear side of the mobile terminal 100. It is understood that the projector module 155 may be positioned at any portion of the mobile terminal 100 as necessary.

The memory 160 is generally used to store various types of data for supporting the processing, control, and storage requirements of the mobile terminal 100. Examples of such data include program instructions for applications operating on the mobile terminal 100, contact data, phonebook data, messages, audio, still pictures, and moving pictures. A recent use history or a cumulative use frequency of each data (e.g., use frequency for each phonebook, each message or each multimedia) may be stored in the memory 160. Moreover, data for various patterns of vibration and/or sound to be output when a touch input is received at the touchscreen may be stored in the memory 160.

Moreover, the memory 160 is displayed as an icon on the screen and is provided with contents for providing a user with various functions. In this case, the content mean such data, which is provided to the mobile terminal 100 and is also executable and displayable in the mobile terminal 100, as phonebook, incoming/outgoing message history, call history, email, music file, video file, image file, schedule, document, memo, game, webpage, application, widget, home screen image and the like. Occasionally, the content can include a menu.

The memory 160 is provided with a single operating system (hereinafter abbreviated OS) or at least two or more operating systems and applications dedicated to each of the operating systems. For example, the operating systems can include Android based OS, Linux based OS, Windows mobile based OS, Apple based OS and the like.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk or an optical disk. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100. The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may work as a signal for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognizing processing for recognizing a handwriting input performed on the touch screen as a character and/or recognizing a picture drawing input performed on the touch screen as characters or images.

The power supply unit 190 provides power required by the various components of the mobile terminal 100. The power may be internal power, external power, or combinations thereof.

One or more embodiments described herein may be wholly or partially implemented by code stored on a recording medium that can be read by a computer or a computer-like or other processing device, or using hardware, or using a combination of hardware and software.

For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

Figure 2A:
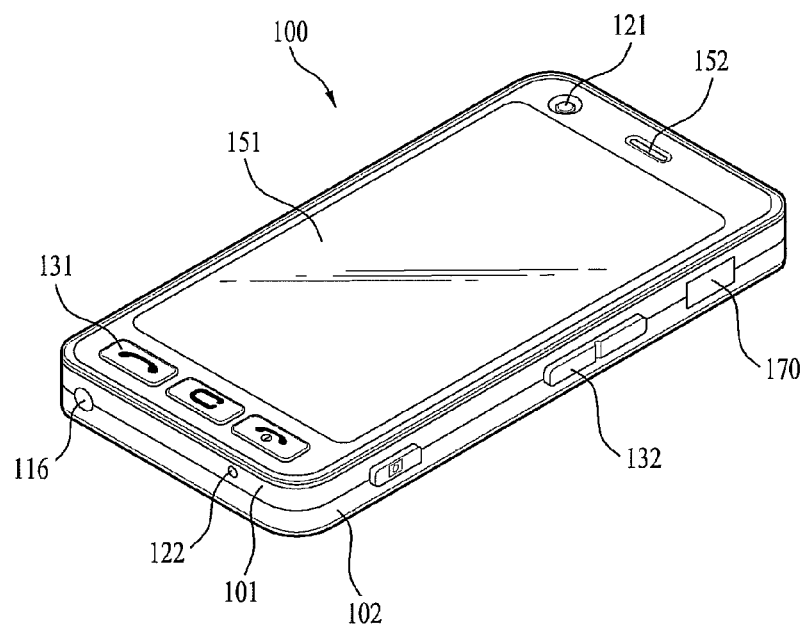
FIG. 2A shows an example of one (front) side of the mobile terminal.

FIG. 2A is a front perspective view showing an example of a front of the mobile terminal 100. The mobile terminal 100 of FIG. 2A is depicted as a bar-type terminal body. However, the mobile terminal 100 may be implemented in a variety of different configurations. Examples of such configurations include a folder-type, a slide-type, a rotational-type, a swing-type and combinations thereof. For clarity, further disclosure will primarily relate to a bar-type mobile terminal 100. However such teachings apply equally to other types of mobile terminals.

The mobile terminal 100 includes a case (casing, housing, cover, etc.) that forms an exterior of the mobile terminal. The case may be divided into a front case 101 and a rear case 102. Various electric/electronic parts are provided in a space between the front case 101 and the rear case 102. A middle case may be further provided between the front case 101 and the rear case 102. The cases can be formed by injection molding of synthetic resin or may be formed of a metallic material, such as stainless steel (STS) or titanium (Ti).

The display unit 151, audio output module 152, camera 121, first and second user manipulating units 130a and 130b, microphone 122 and/or the interface unit 170 can be provided on the terminal body, and more particularly on front case 101.

The display unit 151 occupies most of a main face of the front case 101. The audio output module 152 and the camera 121 may be provided at an area adjacent to one end portion of the display unit 151, while the first manipulating unit 130a and the microphone 122 may be provided at an area adjacent to the other, opposite end portion of the display unit 151. The second manipulating unit 130b and the interface unit 170 can be provided on lateral sides of the front and rear cases 101 and 102.

The user input unit 130 (FIG. 1) may receive a command for controlling an operation of the mobile terminal 100. The user input unit 130 may include a plurality of manipulating units, such as the first and second manipulating units 130a and 130b. The first and second user manipulating units 130a and 130b can be named a manipulating portion and may adopt any mechanism of a tactile manner that enables a user to perform a manipulation action by experiencing a tactile feeling.

Content input via the first manipulating unit 130a or the second manipulating unit 130b can be set to be different. For example, commands such as start, end and scroll can be input via the first manipulating unit 130a. Commands for adjusting volume of sound output from the audio output module 152 and for switching the display unit 151 to a touch recognizing mode can be input via the second manipulating unit 130b.

Figure 2B:
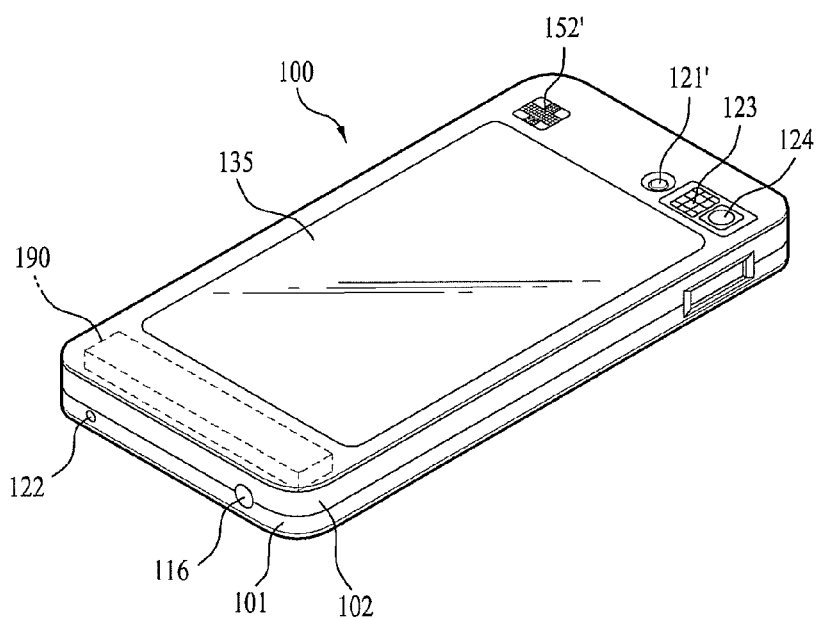
FIG. 2B shows an example of another (rear) side of the mobile terminal.

FIG. 2B is a rear perspective diagram of the mobile terminal 100 shown in FIG. 2A. As shown in FIG. 2B, an additional camera 121' can be provided on a rear side of the terminal body, and more particularly, on the rear case 102. The camera 121' on the rear case 102 has a photographing direction that is substantially opposite to that of the camera 121 shown in FIG. 2A and may have a different resolution.

For example, the camera 121 may have a smaller number of pixels, and thereby have a relatively lower resolution, to capture and transmit an image of the user's face for a video call. On the other hand, the camera 121' may have a greater number of pixels, and thereby have a relatively greater resolution, for capturing an image of a general subject for photography without transmitting the captured image. Each of the cameras 121 and 121' can be configured to be rotated and/or popped up from the terminal body.

A flash 123 and a mirror 124 may be disposed adjacent to the camera 121'. The flash 123 projects light toward a subject when photographing the subject using the camera 121'. When a user attempts to take a picture of himself/herself (self-photography) using the camera 121', the mirror 124 enables the user to view his/her face reflected by the mirror 124.

An additional audio output module 152' can be disposed at the rear side of the terminal body. The additional audio output module 152' facilitates a stereo function in conjunction with the audio output module 152 illustrated in FIG. 2A and may be used for implementation of a speakerphone mode when communicating via the mobile terminal 100.

A broadcast signal receiving antenna 116 can be provided at a lateral side of the terminal body in addition to an antenna for communication. The antenna 116 incorporated into the broadcast receiving module 111 shown in FIG. 1 can be retractable within the terminal body.

The power supply unit 190 for supplying a power to the mobile terminal 100 may be provided in the terminal body. The power supply unit 190 can be configured to be built within the terminal body or to be detachably connected to the terminal body.

FIG. 2B also shows a touchpad 135 for detecting a touch input disposed at the rear case 102. The touchpad 135 can be a light transmissive type, similar to the display unit 151. If the display unit 151 is configured to output visual information from both its front and rear faces, it recognizes the visual information via the touchpad 135 as well. The information output from the front and rear faces can be entirely controlled by the touchpad 135. Alternatively, a display is provided at the touchpad 135 so that a touch screen can be disposed at the rear case 102.

The touchpad 135 is activated by interconnecting with the display unit 151 of the front case 101. The touchpad 135 can be disposed at the rear of, and parallel to, the display unit 151. The touchpad 135 can be of a size equal to or smaller than that of the display unit 151.

Within a screen containing a plurality of contents, a process for informing a user of a position of $2^{nd}$ content associated with user-selected $1^{st}$ content may be performed in accordance with the embodiments shown in FIGS. 3 to 23.

Figure 3:
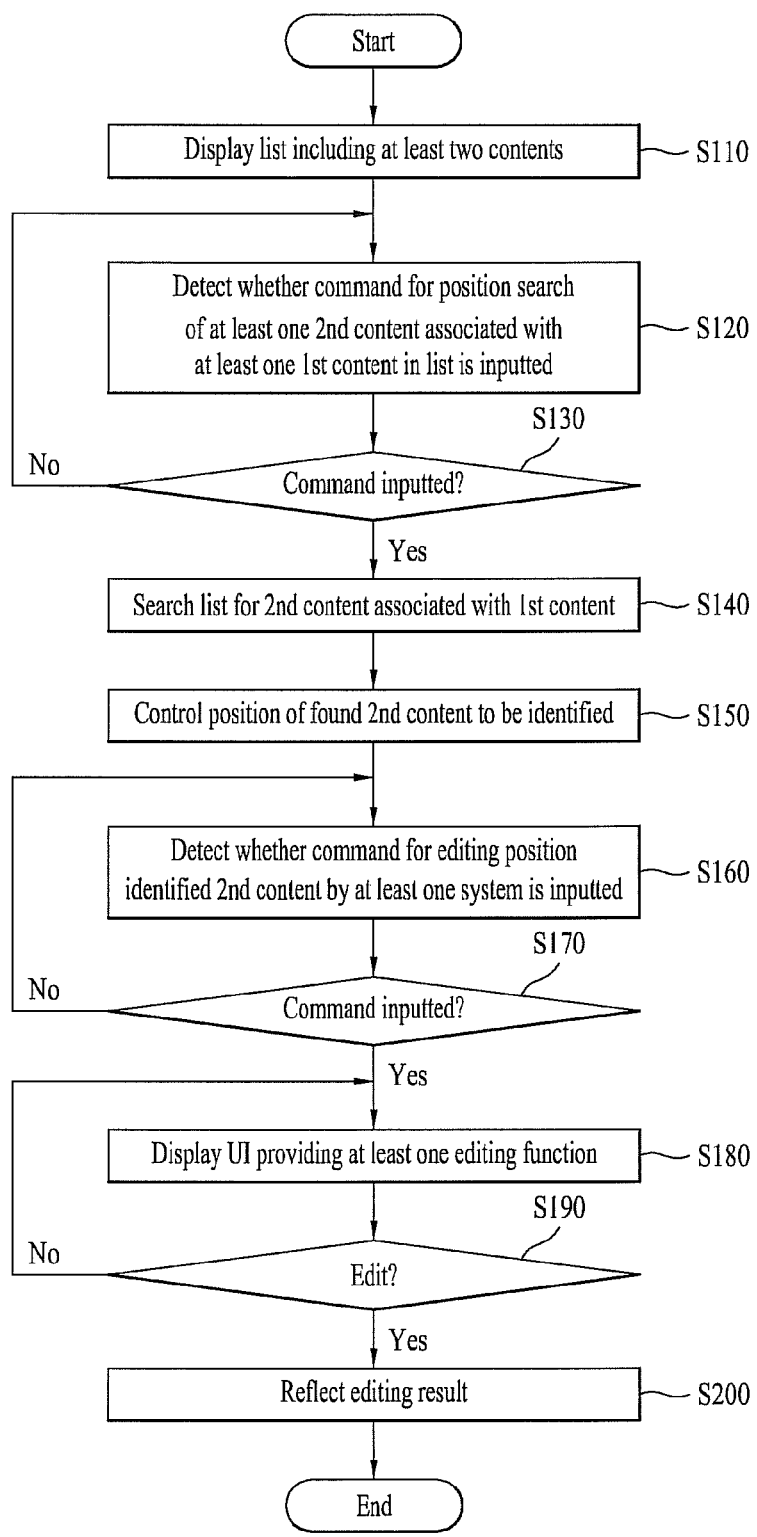
FIG. 3 shows one embodiment of a process for indicating a position of content associated with user-selected content.

FIG. 3 is a flowchart of one embodiment of a process for indicating a position of a content associated with user-selected content. Referring to FIG. 3, while a content list containing at least two contents is displayed on the touchscreen 151 [S110], the controller 180 of the mobile terminal 100 detects whether a position search command for searching the content list to search for a position of at least one $2^{nd}$ content associated with at least one $1^{st}$ content is inputted via the user input unit 130 or the touchscreen 151 [S120].

In this case, as mentioned in the foregoing description with reference to FIG. 1, content may correspond to data which is provided to the mobile terminal 100 and is also executable and displayable in the mobile terminal 100. Examples include but are not limited to data relating to a phonebook, incoming/outgoing message history, call history, email, music file, video file, image file, schedule, document, memo, game, webpage, application, widget, home screen image and the like. Occasionally, the content can include a menu.

In one embodiment, the type of the content is an application or a home or other type of screen containing a plurality of applications. In other embodiments, the content type is non-limited to a home screen application but may include or correspond to other types of data executable and displayable in the mobile terminal 100.

The content in the content list can be sorted in the list in various predetermined ways, either automatically according to a system setting or as specified by a user. For example, the sorting may be performed in order of generated time or in order of specific name (e.g., alphabetically or grouped according to category of subject matter) or use frequency in accordance with a user setting. The specific name can include an index or category name for the contents in the content list. Other bases for sorting the items in the content list may be used.

In one arrangement, the content in the content list displayed in the step S110 are sorted in the content list based on at least one of the generated time order, the index name, the category and the use frequency. For instance, when the content and content list respectively correspond to applications and a home screen containing the applications, FIG. 4 and FIG. 5 show a process for sorting the applications.

Figure 5:
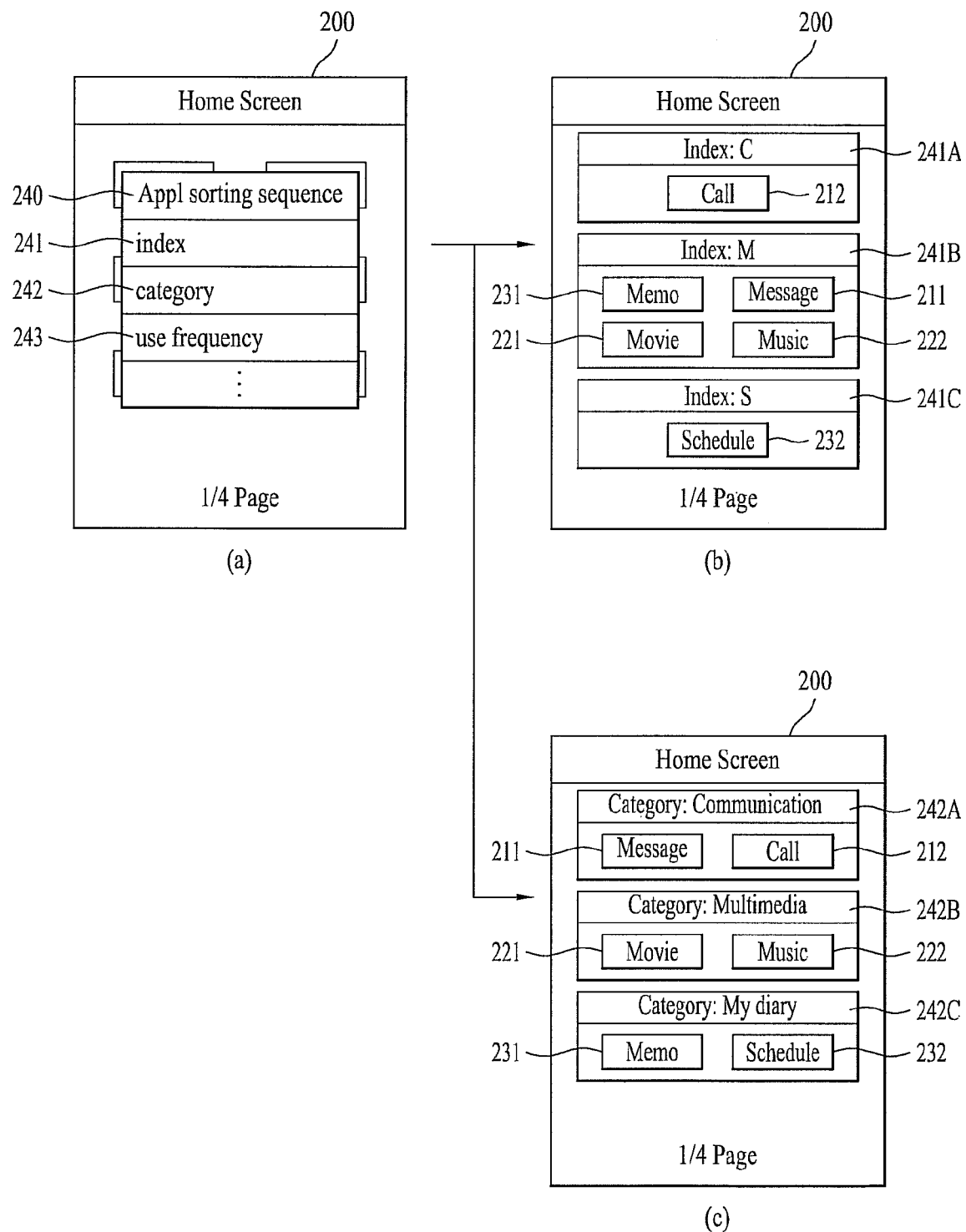

FIG. 4 and FIG. 5 show screen configurations relating to one embodiment of a process for sorting applications contained in a home screen. More specifically, FIG. 4(a) shows a home screen 200 containing a plurality of applications 211, 212, 221, 222, 231 and 232 output on display unit 151. In this example, the applications 211, 212, 221, 222, 231 and 232 are sorted in a predetermined order of generated hours.

If a user inputs a command for changing a sorting sequence of the applications 211, 212, 221, 222, 231 and 232, then referring to FIG. 4(b) the controller 180 displays a user interface (UI) 240 for changing the sorting sequence of the applications 211, 212, 221, 222, 231 and 232.

The UI 240 may include, for example, a $1^{st}$ sorting menu 241 for sorting the applications 211, 212, 221, 222, 231 and 232 in index order, a $2^{nd}$ sorting menu 242 for sorting the applications 211, 212, 221, 222, 231 and 232 based on category, and a $3^{rd}$ sorting menu 243 for sorting the applications 211, 212, 221, 222, 231 and 232 in an order based on a user's frequency of use.

By way of further example, referring to FIGS. 5(a) and (b), if the user selects the $1^{st}$ sorting menu 241, the controller 180 is used to display of applications 211, 212, 221, 222, 231 and 232 in groups based on index name 241A/241B/241C. The index name 241A/241B/241C can include, for example, an initial name of each of the applications 211, 212, 221, 222, 231 and 232.

More particularly, referring to FIG. 5(b), the controller 180 groups the application 'Call' 212 by the index name 'C' 241A, groups the applications 'Memo', 'Message', 'Movie' and 'Music' 231, 211, 221 and 222 by the index name 'M' 241B, and groups the application 'Schedule' 232 into the index name 'S' 241C.

Referring to FIG. 5 (a) and FIG. 5 (c), if a user selects the second sorting menu 242, the controller 180 is controlled to display the applications 211, 212, 221, 222, 231 and 232 in groups based on category name (or subject matter) 242A/242B/242C.

More particularly, referring to FIG. 5(c), the controller groups applications 'Message' 211 and 'Call' 212 under the category name 'Communication' 242A, groups applications 'Movie' 2221 and 'Music' 222 under the category name 'Multimedia' 242B, and groups applications 'Memo' 231 and 'Schedule' 232 under the category name 'My diary' 242C.

If a user selects the $3^{rd}$ sorting menu 243, the controller 180 determines a user's frequency of use of applications 211, 212, 221, 222, 231 and 232 during a recent period (or otherwise a period set by a user). The controller 180 is then able to display the applications 211, 212, 221, 222, 231 and 232 in based on an order of the determined frequency of use. For example, the applications may be sorted in ascending order (lowest frequency to highest frequency of use) or descending order (highest frequency to lowest frequency of use).

Figure 6:
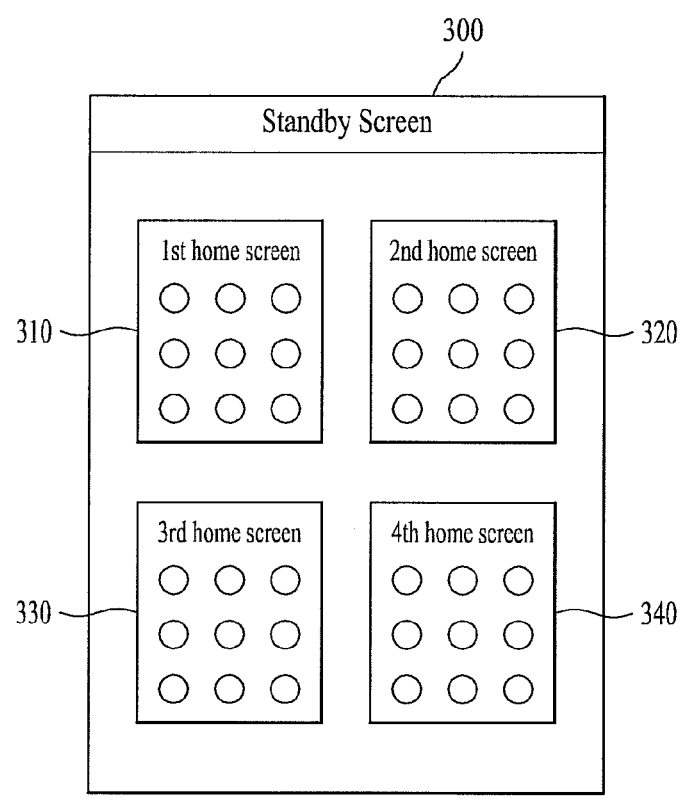

FIG. 6 shows another embodiment for displaying a plurality of applications. In this embodiment, multiple home screens 310, 320, 330 and 340 are simultaneously displayed in a standby screen 300 based on, for example, the content shown in FIG. 3. Each of the home screens 310, 320, 330 and 340 is represented as a thumbnail image. If a specific one of the home screens 310, 320, 330 and 340 is selected, the controller 180 displays the selected home screen on the screen of the display unit 151 in a full- or larger screen format or switches a current screen to the selected home screen.

Also, each of the home screens 310, 320, 330 and 340 may serve as a sub-home screen for a respective page within an initial home screen. For example, an initial home screen may consist of a plurality of pages, each of which contains a plurality of applications, and each of the home screens 310, 320, 330 and 340 may correspond to each page of the initial home screen. In this case, the home screens 310, 320, 330 and 340 can be displayed in page order.

If the mobile terminal 100 supports a plurality of operating systems, the home screens 310, 320, 330 and 340 may be home screens that correspond to respective ones of the operating systems. The description of the step S130 continues as follows.

If the controller 180 detects that a position search command is inputted in the step S120 [S130], the controller 180 searches the content list for at least one $2^{nd}$ content associated with the selected $1^{st}$ content [S140] and controls a position of the found $2^{nd}$ content to be identified [S150]. The $2^{nd}$ content associated with the $1^{st}$ content may be content having a same category or function as the $1^{st}$ content.

For instance, if the $1^{st}$ content is a call function, the $2^{nd}$ content associated with the $1^{st}$ content may be a phonebook function. If the $1^{st}$ content is a social networking service (SNS) application, the $2^{nd}$ content associated with the first content may correspond to Facebook or Twitter.

The found $2^{nd}$ content can belong to a page displayed on a current screen together with the $1^{st}$ content among the pages of the content list or may not belong to a page, which is not displayed on the current screen, among the pages of the content list.

In order to inform a user of the position of the found $2^{nd}$ content in the step S150, the controller 180 displays the $2^{nd}$ content in a manner of differentiating a display style of the $2^{nd}$ content from that of other contents, displays an information indicating the position of the $2^{nd}$ content, or controls the audio output module 152 to output audio data indicating the position of the $2^{nd}$ content. In the following description, the steps S130 to S150 in FIG. 3 are explained in detail with reference to FIGS. 7 to 16.

In at least one of these embodiments, a content list may be displayed on the display unit 151 is a home screen containing a plurality of applications. At least one $2^{nd}$ application associated with a $1^{st}$ application selected by a user from the home screen is searched for. A user is then informed of a position on a screen for the found $2^{nd}$ application. (In one embodiment, the home screen includes a standby screen. In particular, the home screen is just taken as an example to describe the steps S130 to S150 more clearly. And, any screen containing a plurality of applications can become the content list.)

Figure 7:
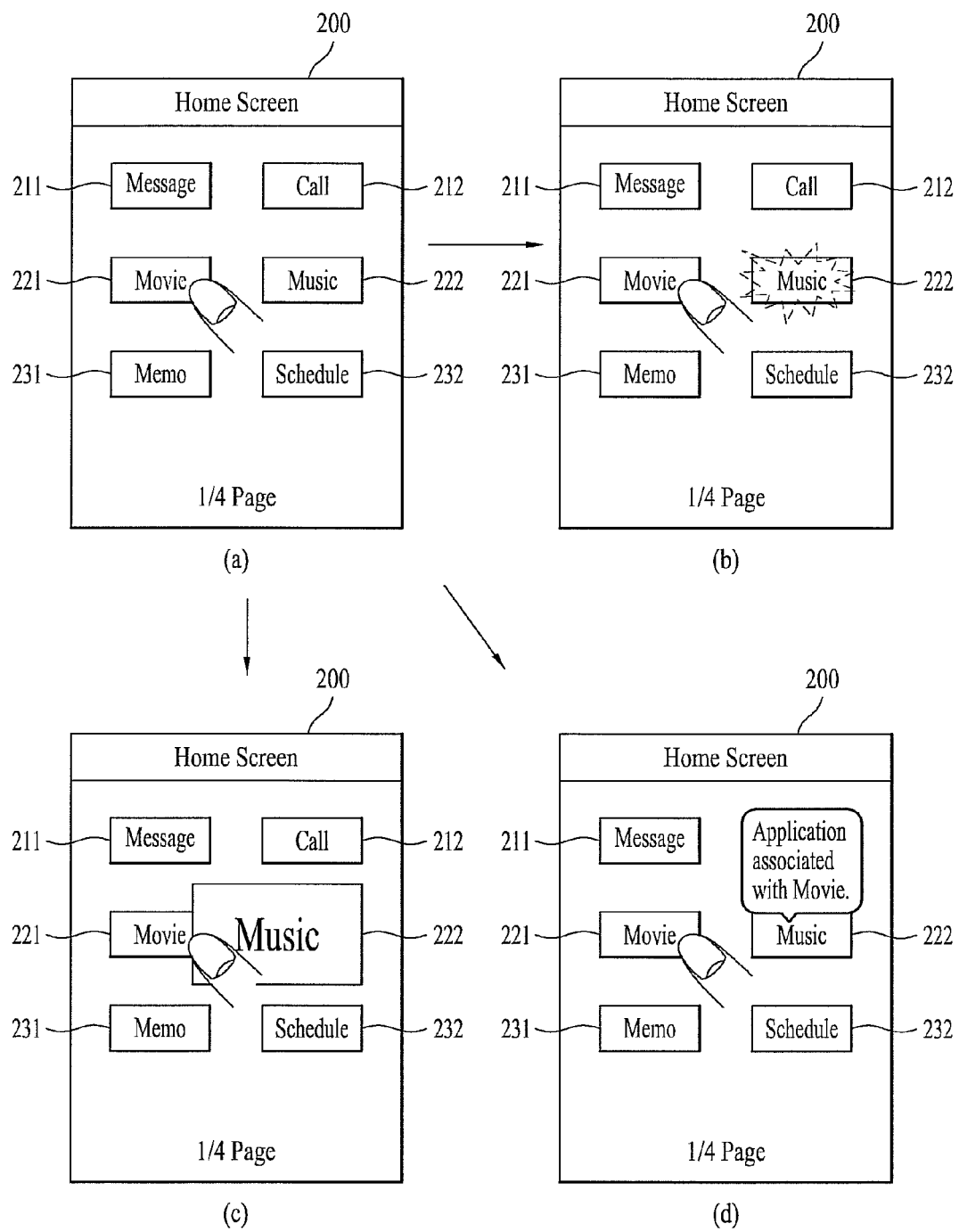

FIG. 7 shows that the found $2^{nd}$ application belongs to or is associated with a $1^{st}$ page displayed on a current screen together with the $1^{st}$ application among a plurality of pages of the home screen.

Referring to FIG. 7, if a $1^{st}$ application 221 is selected from a $1^{st}$ page of a home screen 200 currently displayed on a screen [FIG. 7 (a)], the controller 180 searches all applications provided to the home screen 200 for at least one $2^{nd}$ application 222 associated with the selected Pt application 221. The controller 180 is then able to display the $2^{nd}$ application 222 in a manner different from other applications in display style in order to identify a position of the found $2^{nd}$ application 222 [FIGS. 7(b) to 7(d)].

Thereafter, if a long-touch input is applied to the $1^{st}$ application 221, the controller 180 recognizes the long-touch input as a search command for the $2^{nd}$ application 222 associated with the $1^{st}$ application 221 and is then able to control the $2^{nd}$ application 222 to be displayed in a manner different from other applications in display style, to thereby enable a position of the found $2^{nd}$ application 222 to be identifiable. (Herein, a long-touch input may include the case where an input applied to a $1^{st}$ application is of a duration longer than a predetermined time).

FIG. 7 shows that the $2^{nd}$ application 222 associated with the $1^{st}$ application 221 belongs to the $1^{st}$ page currently displayed on the screen together with the $1^{st}$ application 221 among the pages of the home screen 200. (That is, the $2^{nd}$ application is in the same screen as the $1^{st}$ application and/or on a same hierarchy level as the $1^{st}$ application). The manner of distinguishing the $2^{nd}$ application may be accomplished in various ways.

Referring to FIG. 7(b), the controller 180 controls an icon or display area for the found $2^{nd}$ application 222 to blink, to thereby inform a user of the position of the $2^{nd}$ application 222.

Referring to FIG. 7(c), the controller 180 displays an icon or display area for the found $2^{nd}$ application 222 to be larger in size than other or remaining ones of the applications in the screen, to thereby inform a user of the position of the $2^{nd}$ application.

Referring to FIG. 7(d), the controller 180 displays information indicating that the $2^{nd}$ application 222 is an application associated with the $1^{st}$ application. This may be accomplished, for example, by displaying a word balloon around (or other textual or graphical information proximate an icon or display area corresponding to) the found $2^{nd}$ application. Hence, the controller 180 is able to inform a user of the position of the $2^{nd}$ application 222.

Additionally, or alternatively, the controller 180 controls the found $2^{nd}$ application 222 to be displayed in a different color from other applications, to thereby inform a user of the position of the $2^{nd}$ application. Additionally, or alternatively, the controller 180 controls text corresponding to the found $2^{nd}$ application 222 to be displayed in a differ font from other applications, to thereby inform a user of the position of the $2^{nd}$ application 222.

In attempting to change the display style of the $2^{nd}$ application 222 to enable the position of the $2^{nd}$ application 222 to be identifiable, if the touch to the $1^{st}$ application 221 is canceled (e.g., a short-touch is performed instead of a long touch or otherwise), the controller 180 is able to display the $2^{nd}$ application 222 by controlling the display style of the $2^{nd}$ application to maintain to its initial display style or to return to its initially display style if the change has already been made.

FIGS. 8 to 11 show that the $2^{nd}$ application 222 associated with the $1^{st}$ application 221 may be displayed on a $2^{nd}$ page, which is not currently displayed on the same screen as the $1^{st}$ application or on the home screen.

Referring to FIG. 8(a), when the $1^{st}$ application 221 is selected, the controller 180 searches for the $2^{nd}$ application 222 associated with the $1^{st}$ application 221. This may be performed based on information stored in association with each application, based on metadata stored in association with each application, or based on other stored or assigned data. The controller may perform a search to locate common or related information to determine one or more $2^{nd}$ applications.

If the found $2^{nd}$ application 222 is situated on a $2^{nd}$ page which is not currently displayed of the home screen, when the home screen is turned from a currently displayed $1^{st}$ page of the home screen to the $2^{nd}$ page, the controller 180 is able to control the $2^{nd}$ application 222 to be displayed in a manner differ from other applications, for example, in terms of display style. This may be performed, for example, using any of the approaches previously discussed (including ones described in relation to FIG. 7) to enable a position of the found $2^{nd}$ application 222 to be identifiable within the $2^{nd}$ page, as illustratively shown in FIG. 8 (*b*).

Figure 9:
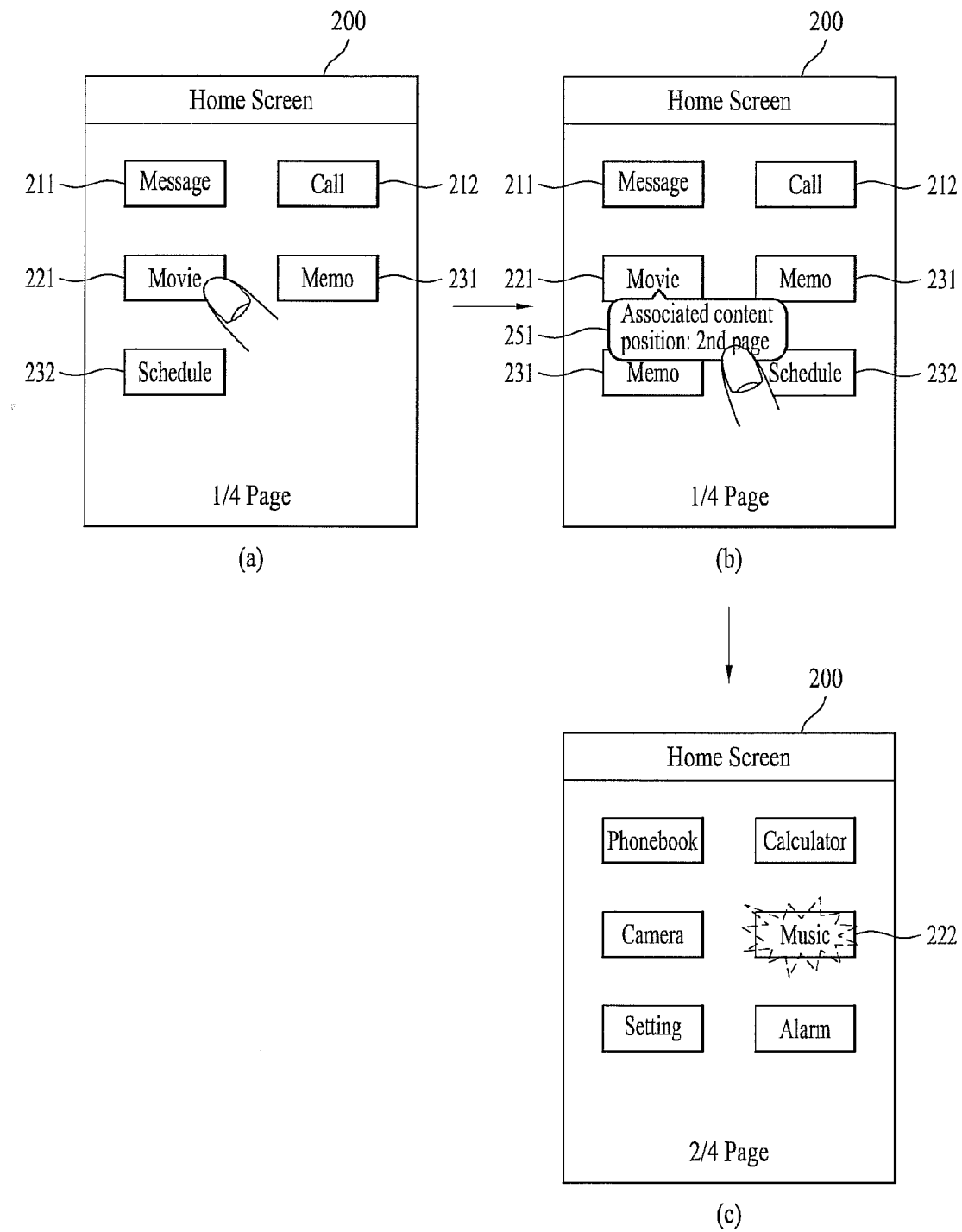

Referring to FIG. 9(*a*), when the $1^{st}$ application 221 is selected, the controller 180 searches for the $2^{nd}$ application 222 associated with the $1^{st}$ application 221. If the found $2^{nd}$ application 222 is situated on a $2^{nd}$ page which is not currently displayed on the home screen, when the home screen is turned from a currently displayed $1^{st}$ page of the home screen to the $2^{nd}$ page, the controller 180 generates location information 251 indicating a location of the found $2^{nd}$ application 222 and then displays the location information 251 in the vicinity of the $1^{st}$ application, as illustratively shown in FIG. 9 (*b*).

When the location information 251 is selected, the controller 180 directly turns the home screen from a currently displayed $1^{st}$ page of the home screen to the $2^{nd}$ page and is then able to control the $2^{nd}$ application 222 to be displayed in a manner different from other applications in terms of display style. This many be accomplished, for example, using any of the approaches described with reference to FIG. 7 to enable a position of the $2^{nd}$ application 222 to be identifiable within the $2^{nd}$ page as shown in FIG. 9(*c*).

Figure 10:
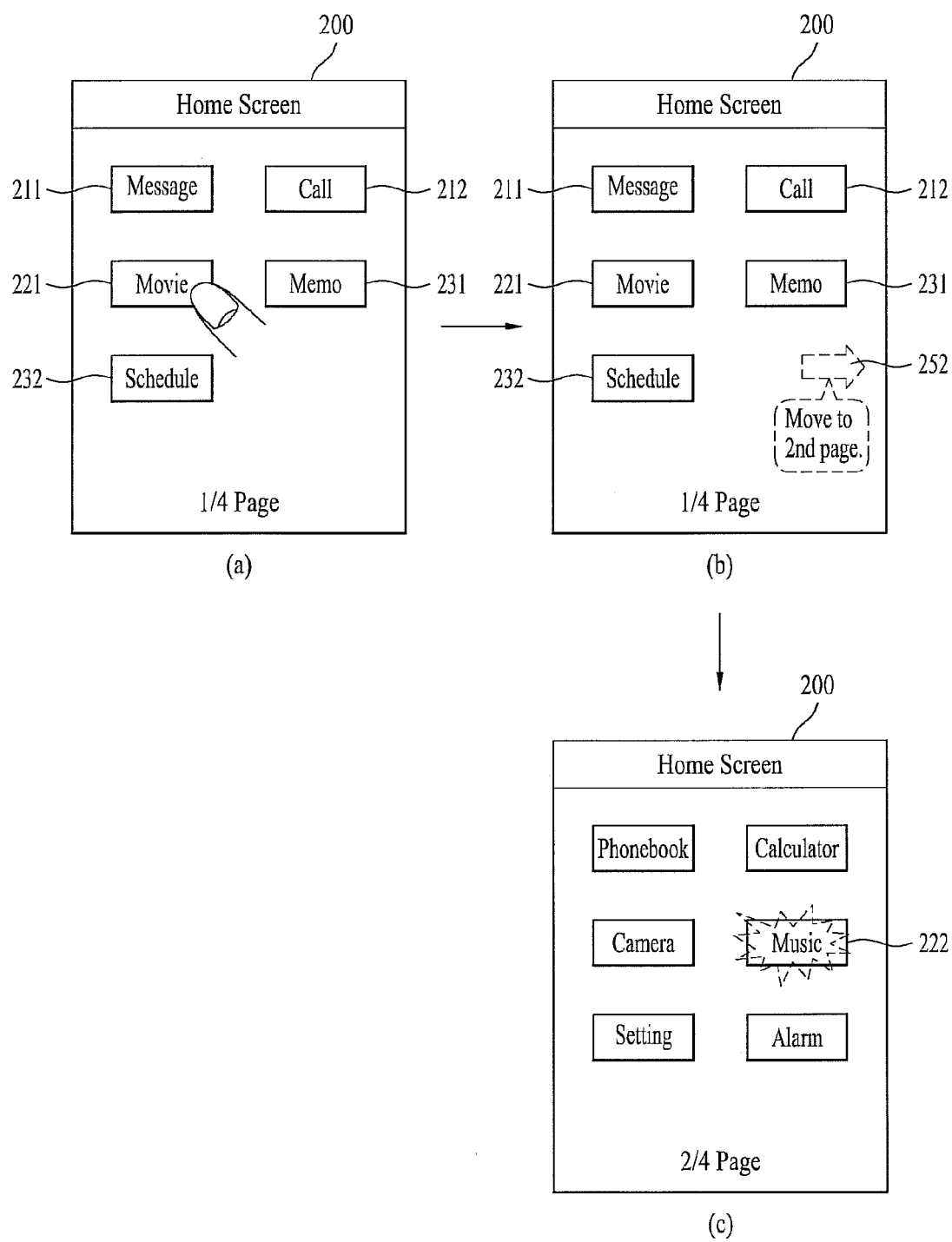

Referring to FIG. 10, when the $1^{st}$ application 221 is selected (e.g., as in FIG. 9 (*a*)), the controller 180 searches for the $2^{nd}$ application 222 associated with the $1^{st}$ application 221. When the found $2^{nd}$ application 222 is situated on a $2^{nd}$ page which is not currently displayed on the home screen, the controller 180 generates guide information 252 for guiding the turning of the home screen from the $1^{st}$ page to the $2^{nd}$ page, on which the $2^{nd}$ application 222 is situated, and then controls the guide information 252 to be displayed on the first page, as illustratively shown in FIG. 10 (*b*).

For instance, if a user's flicking touch in a right direction is used as a command for turning the home screen from the $1^{st}$ page to the $2^{nd}$ page, referring to FIG. 10B, the controller 180 displays an image and text for guiding the user's flicking touch in the right direction.

If the user turns the home page from the $1^{st}$ page to the $2^{nd}$ page with reference to the guide information 22, the controller 180 is able to control the $2^{nd}$ application 222 to be displayed in a manner different from other applications in terms of display style. This may be accomplished, for example, using any of the approached described with reference to FIG. 7 to enable a position of the $2^{nd}$ application 222 to be identifiable within the $2^{nd}$ page, as illustratively shown in FIG. 10 (*c*).

Figure 11:
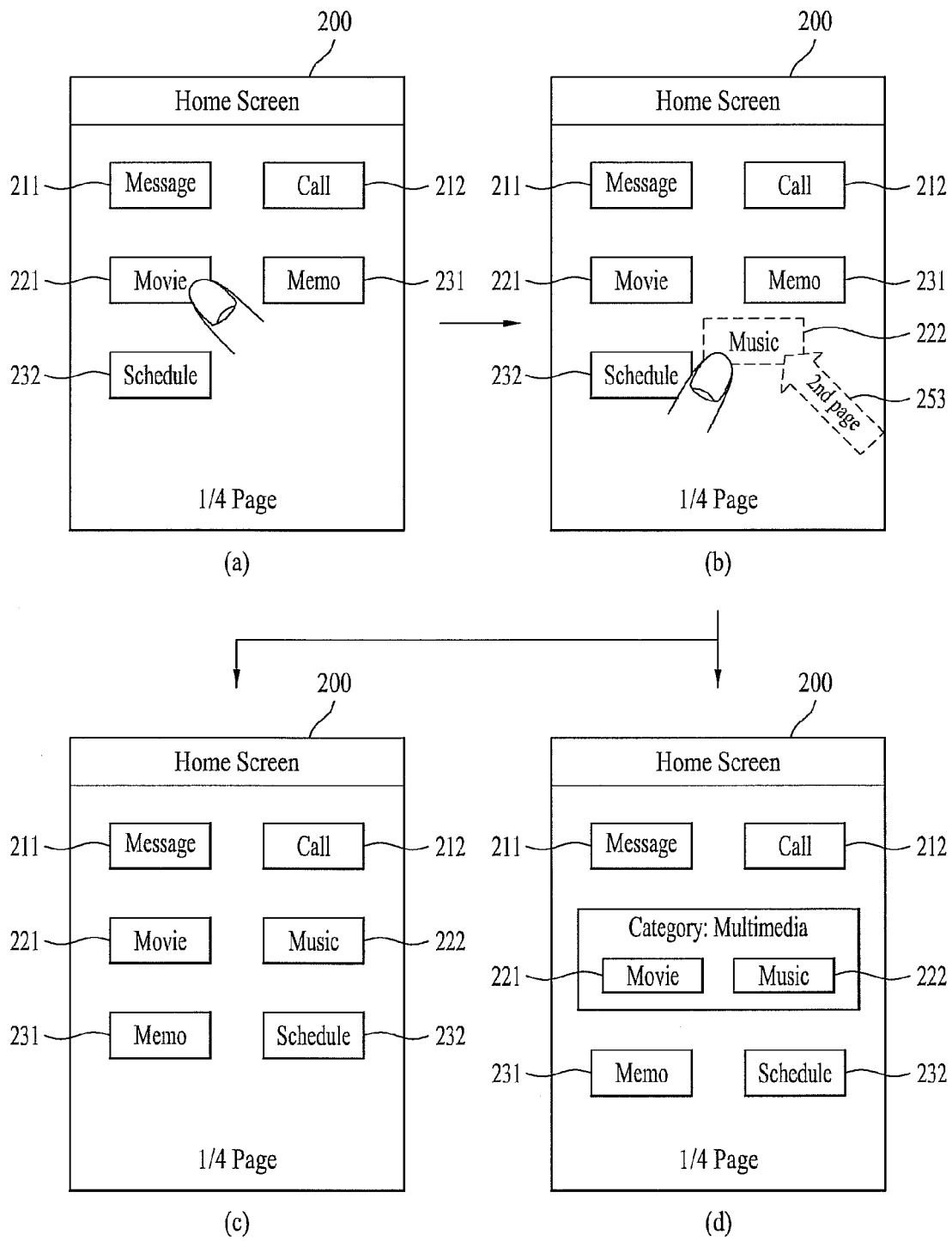

Referring to FIG. 11, when the $1^{st}$ application 221 is selected (as shown, for example, in FIG. 9 (*a*)), the controller 180 searches for the $2^{nd}$ application 222 associated with the $1^{st}$ application 221. When the found $2^{nd}$ application 222 is situated on a $2^{nd}$ page which is not currently displayed on the home screen, the controller 180 displays the $2^{nd}$ application 222 by shifting the $2^{nd}$ application 222 to a peripheral or other predetermined position around the $1^{st}$ application 221 temporarily, and is also displays information 253 indicating the $2^{nd}$ page on which the $2^{nd}$ application 222 is situated, as illustratively shown in FIG. 11 (*b*).

When the temporarily shifted $2^{nd}$ application 222 is selected, referring to FIG. 11(*c*), the controller 180 shifts the $2^{nd}$ application 222 into the currently displayed $1^{st}$ page or turns the home screen from the $1^{st}$ page to the $2^{nd}$ page, on which the $2^{nd}$ application 222 is substantially situated. The $2^{nd}$ application 222 is then controlled to be displayed in an identifiable or differentiated manner.

If the temporarily shifted $2^{nd}$ application 222 is selected, referring to FIG. 11(*d*), the controller 180 groups display of the $1^{st}$ application 221 and the $2^{nd}$ application 222 into one group. More particularly, with reference to FIG. 18, the controller 180 may group the $2^{nd}$ application 222 into the group of the $1^{st}$ application 221. Alternatively, with reference to FIG. 19, the controller 180 may group the $1^{st}$ application 221 and the $2^{nd}$ application 222 into a new group.

Figure 12:
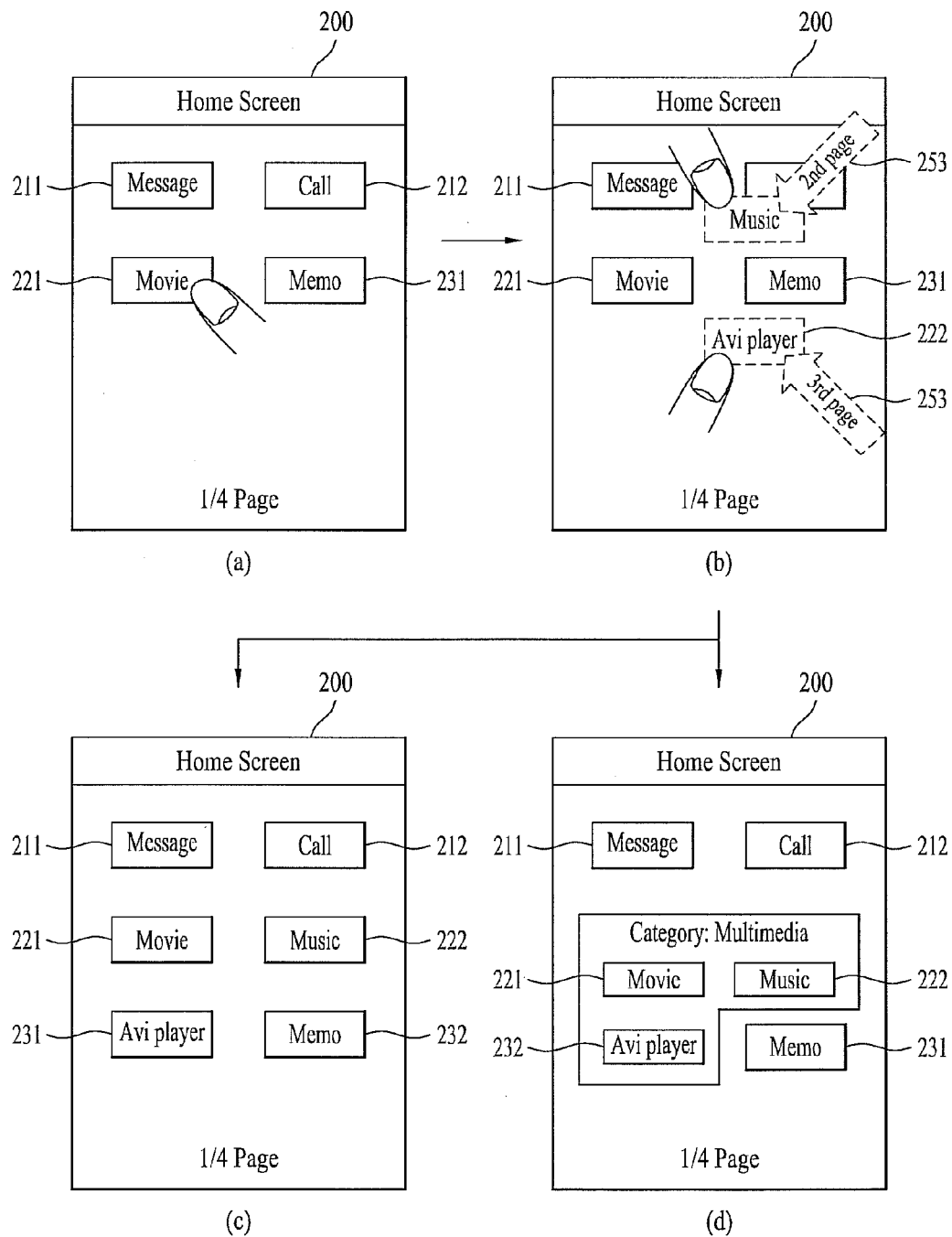

Referring to FIG. 12(*b*), if at least two applications associated with the $1^{st}$ application 221 are found, with reference to FIG. 11, the controller 180 may display the found at least two applications (e.g., $2^{nd}$ application 222 and $3^{rd}$ application 223) by shifting them around the $1^{st}$ application 221 temporarily and may also display information 253 respectively indicating $2^{nd}$ and $3^{rd}$ pages, on which the $2^{nd}$ and $3^{rd}$ applications 222 and 223 are situated.

Subsequently, referring to FIG. 12(*c*), the controller 180 may shift the $2^{nd}$ and $3^{rd}$ applications 222 and 223 respectively situated on the $2^{nd}$ and $3^{rd}$ pages to a currently displayed $1^{st}$ page.

Alternatively, referring to FIG. 12(*d*), the controller 180 may group the $1^{st}$ application 221 and the $2^{nd}$ & $3^{rd}$ applications 222 & 223 into one group. In & 3rd particular, with reference to FIG. 18, the controller 180 may group the $2^{nd}$ & $3^{rd}$ applications 222 & 223 into the group of the $1^{st}$ application 221. Alternatively, with reference to FIG. 19, the controller 180 may group the $1^{st}$ to $3^{rd}$ applications 221 to 223 into a new group.

In the following description, the steps S130 to S150 are explained in detail with reference to FIG. 13 and FIG. 14. In particular, assuming that a content list displayed on the display unit 151 is a home screen on which a plurality of applications are sorted by specific names according to the process shown in FIG. 4 and FIG. 5, a process including the steps of searching the home screen for at least one $2^{nd}$ application associated with a $1^{st}$ application selected by a user and informing the user of a position on a screen for the found $2^{nd}$ application is described with reference to FIG. 13 and FIG. 14 in detail as follows.

In this case, the applications can be sorted by index names, category names or use frequency orders in accordance with the process described with reference to FIG. 4 and FIG. 5.

Figure 13:
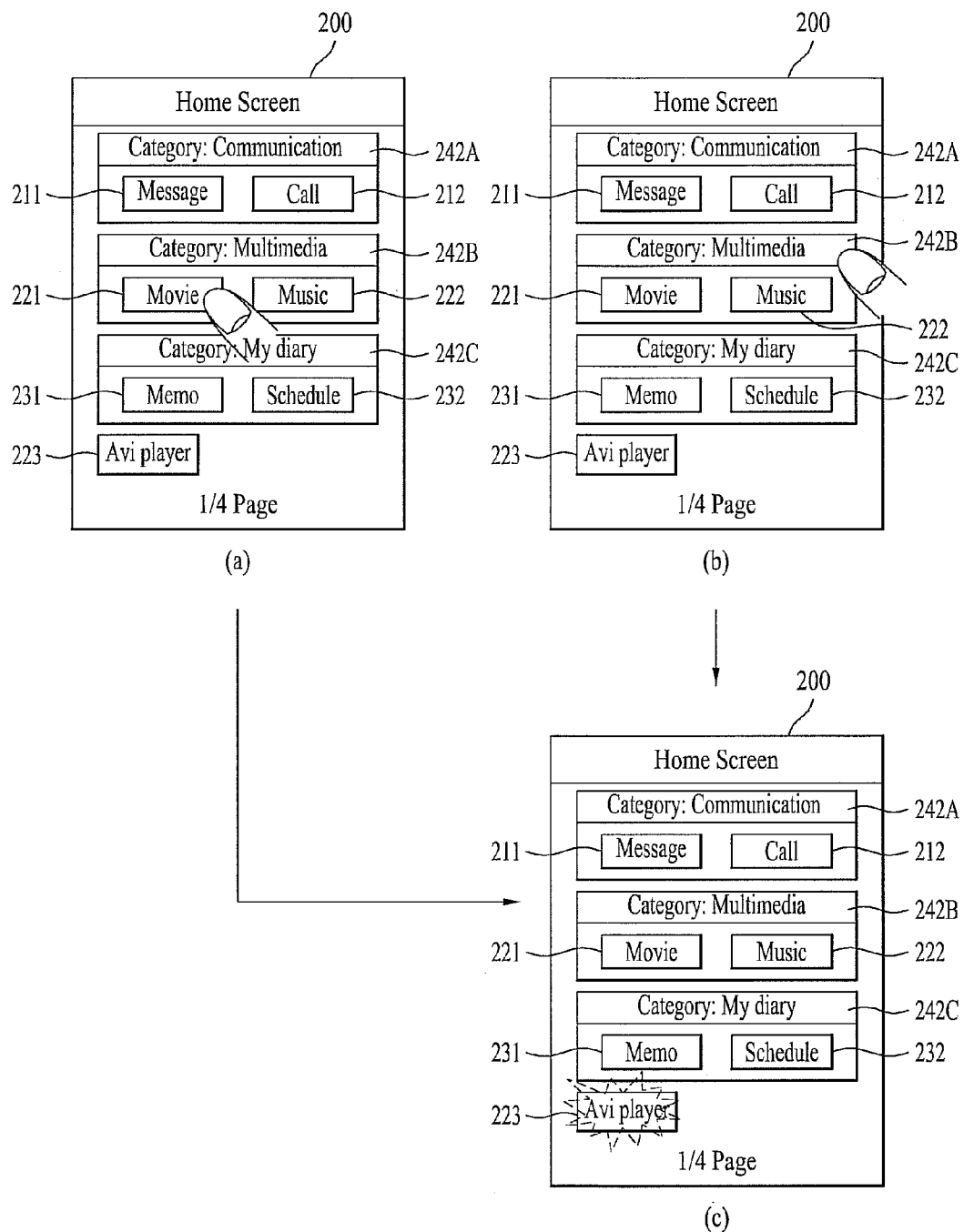

FIG. 13 shows that applications 211, 212, 221, 222, 231 and 232 in a home screen 200 are grouped by category name and also shows that the application 'Avi player' 223 is not grouped by the category name only.

Referring to FIG. 13(*a*) and FIG. 13(*c*), when the $1^{st}$ application 221 is selected from $1^{st}$ page of the home screen currently displayed on the screen, the controller 180 searches for applications provided within the home screen 200 for at least one application 'Avi player' 223 failing to be grouped into a category group 242B, to which the $1^{st}$ application 221 belongs, despite belonging to the category 242B associated with the $1^{st}$ application.

In this case, the found application 'Avi player' 223 may not grouped by the category name or can belong to a category group different from that of the $1^{st}$ application 221.

If the application 'Avi player' 223 is found, referring to FIG. 13(*c*), the controller 180 is able to control the application 'Avi player' 223 to be displayed in a manner differ from other applications in terms of display style using, for example, any of the approaches of FIG. 7 in order to enable a position of the found application 'Avi player' 223 to be identifiable.

Thereafter, if a long-touch (or other designating) input is applied to the 1$^{st}$ application 221, the controller 180 recognizes the long-touch input as a command for searching for the application 'Avi player' 223, which belongs to the category 242B associated with the 1$^{st}$ application 221 but is not grouped into the group of the category 242B having the 1$^{st}$ application 221 belong thereto. The controller then controls the application 'Avi player' 223 to be displayed in a manner different from other applications in terms of display style, to thereby enable a position of the found application 'Avi player' 223 to be identifiable.

Referring to FIG. 13(b) and FIG. 13(c), if a specific category name 242B is selected from 1$^{st}$ page of the home screen currently displayed on the screen, the controller 180 searches the applications not grouped by the selected category name 242B for at least one application 'Avi player' 223 belonging to the selected category name 242B.

If the application 'Avi player' 223 is found, referring to FIG. 13(c), the controller 180 is able to control the application 'Avi player' 223 to be displayed in a different manner from other applications in terms of display style using, for example, the aforesaid process shown in FIG. 7 in order to enable a position of the found application 'Avi player' 223 to be identifiable.

Thereafter, if a long-touch input is applied to the category name 242B, the controller 180 recognizes the long-touch input as a command for searching the applications not grouped by the category name 242B for at least one application 'Avi player' 223 belonging to the category name 242. The controller then controls the application 'Avi player' 223 to be displayed in a different manner from other applications in terms of display style to enable a position of the found application 'Avi player' 223 to be identifiable.

Figure 14:
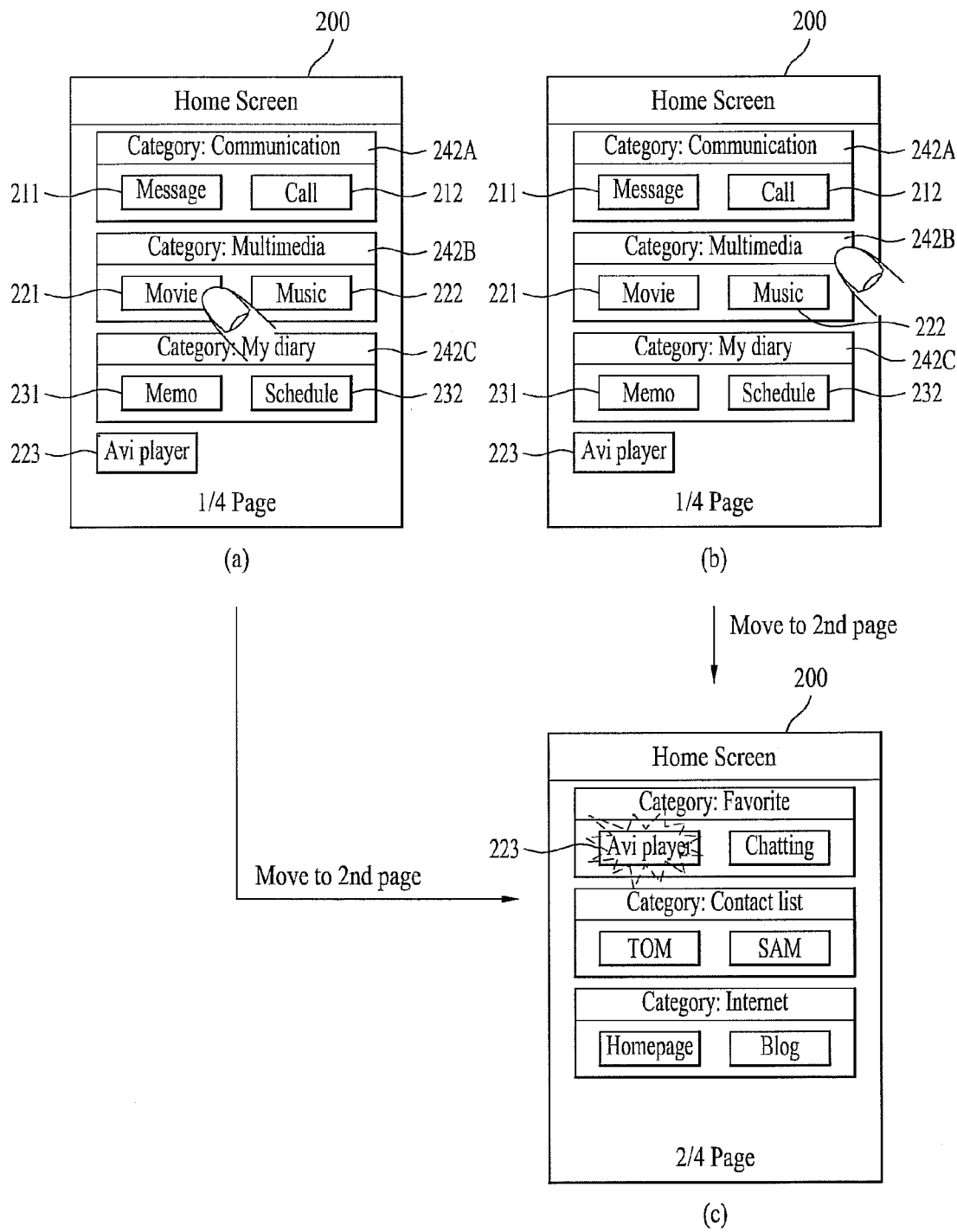

FIG. 14 shows that the application 'Avi player' 223 associated with the 1$^{st}$ application 221 or the category name 242B is situated on a 2$^{nd}$ page, which is not currently displayed on the screen, of the home screen 200.

Referring to FIG. 14(a) and FIG. 14(c), if the 1$^{st}$ application 221 is selected, the controller 180 acquires whether the application 'Avi player' 223, which is not grouped into the group of the category name 242B of the 1$^{st}$ application 221 despite belonging to the category 242B associated with the 1$^{st}$ application 221, is situated on a 2$^{nd}$ page which is not currently displayed on the home screen.

When the application 'Avi player' 223 is not situated on the 2$^{nd}$ page which is not currently displayed on the home screen, referring to FIG. 14(c), and when the home screen is turned from the currently displayed 1$^{st}$ page to the 2$^{nd}$ page, the controller 180 controls the application 'Avi player' 223 to be displayed differently from other applications in terms of display style using, for example, the aforesaid process shown in FIG. 7, in order to enable a position of the application 'Avi player' 223 to be identifiable within the 2$^{nd}$ page.

Referring to FIG. 14(b) and FIG. 14(c), when a specific category name 242B is selected, the controller 180 searches the applications failing to be grouped by the selected category name 242B for at least one application 'Avi player' 223 belonging to the selected category name 242B. Subsequently, the controller 180 determines whether the found application 'Avi player' 223 is situated on a 2$^{nd}$ page which is not currently displayed on the home screen.

If the found application 'Avi player' 223 is situated on the 2$^{nd}$ page which is not currently displayed of the home screen, referring to FIG. 14(c), when the home screen is turned from the currently displayed 1$^{st}$ page to the 2$^{nd}$ page, the controller 180 control the application 'Avi player' 223 to be displayed differently from other applications in terms of display style using, for example, the aforesaid process shown in FIG. 7, in order to enable a position of the application 'Avi player' 223 to be identifiable within the 2$^{nd}$ page.

Additionally, although the controller 180 searches for the application 'Avi player' 223 associated with the selected 1$^{st}$ application 221 or the selected category name 242B, when the found application 'Avi player' 223 is situated on the 2$^{nd}$ page that is not currently displayed, the controller 180 may generate position information indicating a position of the application 'Avi player' 223 or the category name 242B in the same manner shown in FIG. 9. The generated position information may then be displayed in a vicinity of the first application 221.

Thereafter, when the position information is selected, the controller 180 directly turns the home screen from the 1$^{st}$ page to the 2$^{nd}$ page on which the application 'Avi player' 223 is situated in the same manner shown in FIG. 9. The controller then controls the position of the application 'Avi player' 223 to be identifiable within the 2$^{nd}$ page.

Moreover, although the controller 180 searches for the application 'Avi player' 223 associated with the selected 1$^{st}$ application 221 or the selected category name 242B, if the found application 'Avi player' 223 is situated on the 2$^{nd}$ page that is not currently displayed, the controller 180 generates a guide information for guiding to turn the home page from the 1$^{st}$ page to the 2$^{nd}$ page, on which the application 'Avi player' 223 is situated in the same manner shown in FIG. 10. The controller then displays the generated guide information on the 1$^{st}$ page.

Moreover, although the controller 180 searches for the application 'Avi player' 223 associated with the selected 1$^{st}$ application 221 or the selected category name 242B, if the found application 'Avi player' 223 is situated on the 2$^{nd}$ page that is not currently displayed, the controller 180 temporarily shifts and displays the application 'Avi player' 223 in a vicinity of the 1$^{st}$ application 221 or the category name 242B in the same manner shown in FIG. 11. The controller also generates and displays information indicating the 2$^{nd}$ page on which the found application 'Avi player' 223 is situated.

When the temporarily shifted application 'Avi player' 223 is selected, the controller 180 shifts the application 'Avi player' 223 used to be situated on the 2$^{nd}$ page to the currently displayed 1$^{st}$ page or directly shifts the 1$^{st}$ page to the 2$^{nd}$ page, on which the application 'Avi player' 223 is actually situated. The controller then controls the application 'Avi player' 223 to be identifiable.

Figure 15:
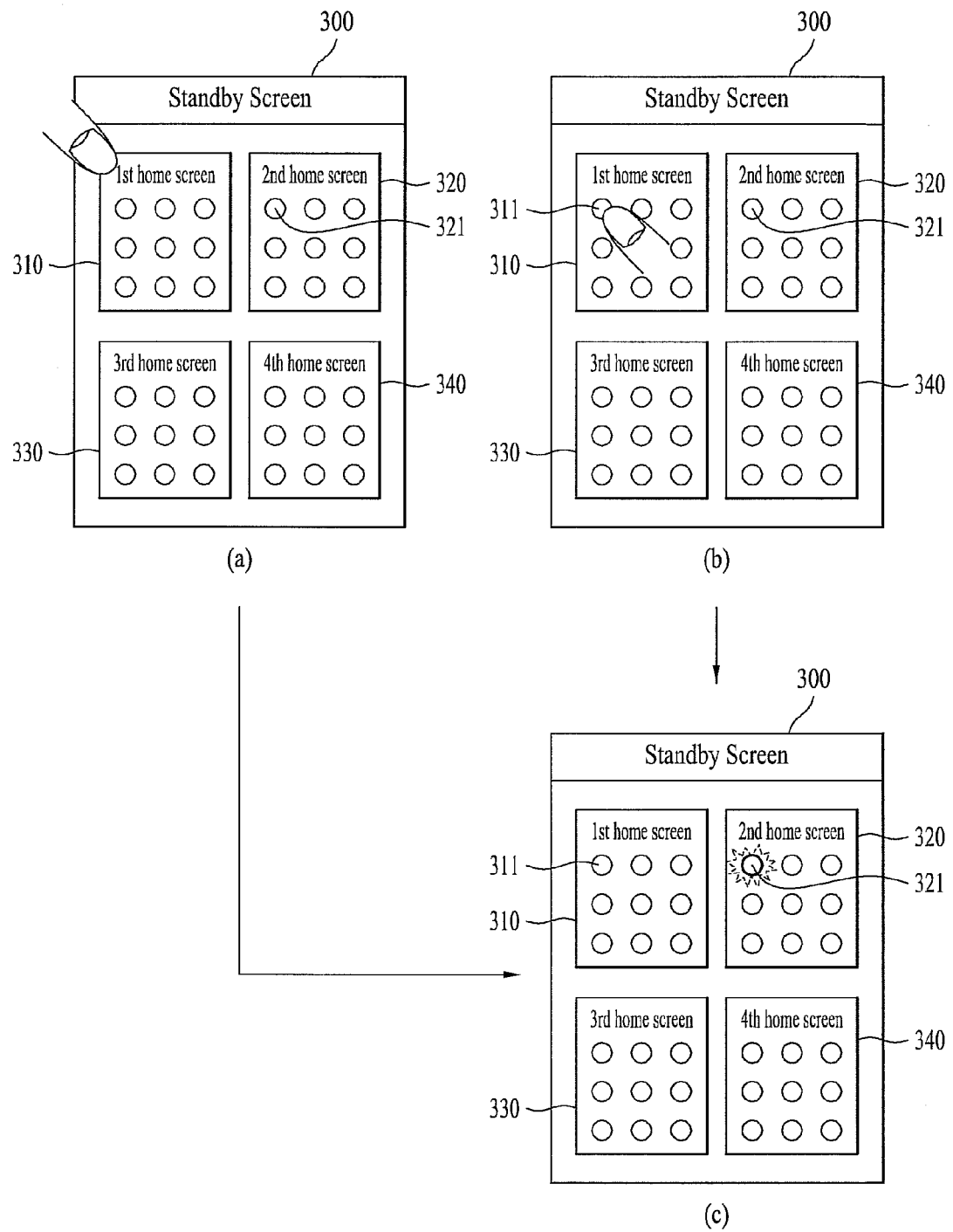
Figure 16:
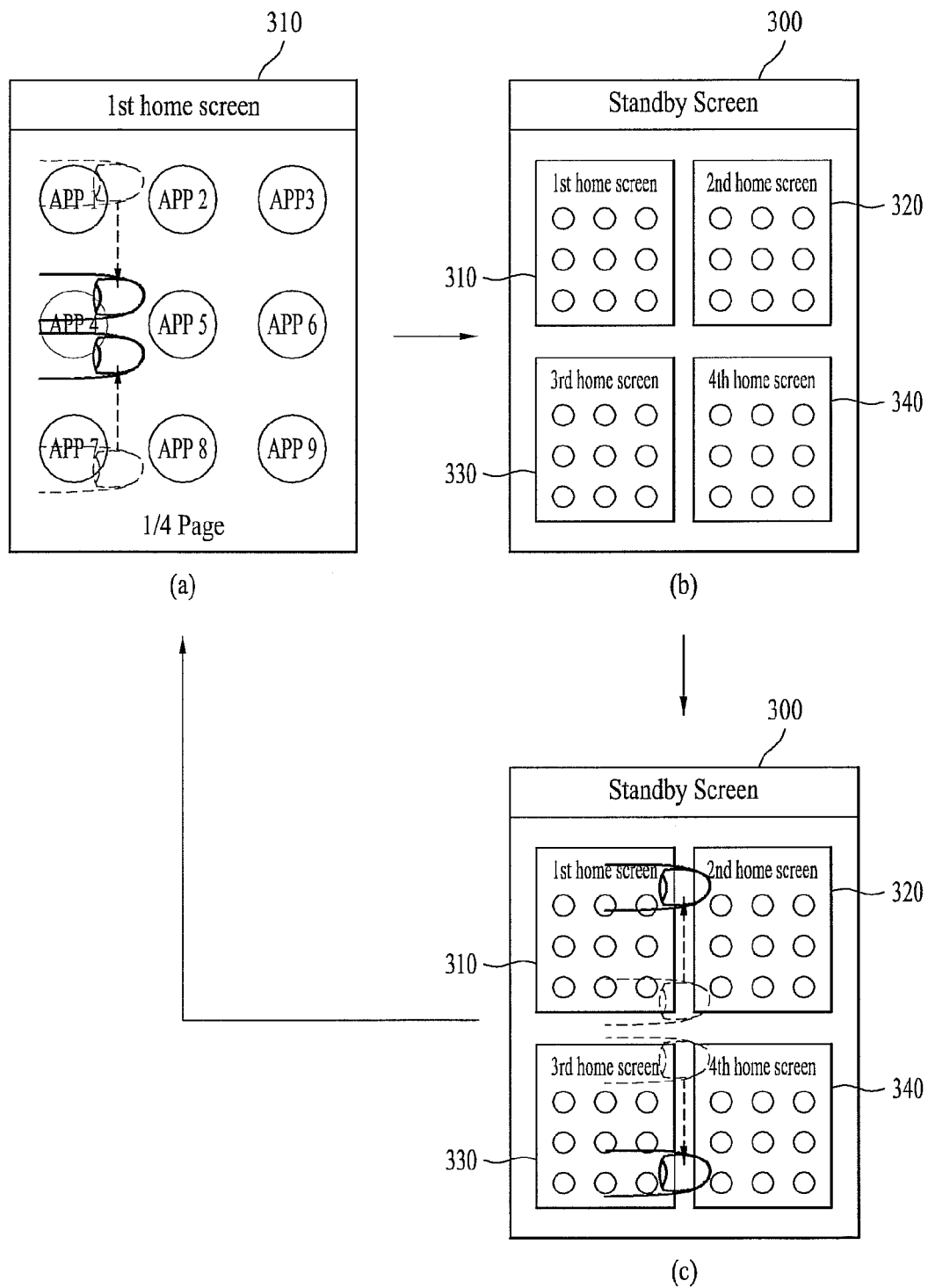

In the following description, the steps S130 to S150 are explained in detail with reference to FIG. 15 and FIG. 16. In particular, assuming that contents displayed on the display unit 151 include a plurality of simultaneously displayed home screens, each of which contains a plurality of applications, if a specific 1$^{st}$ home screen is selected by a user, a process is performed for searching applications contained in another home screen for at least one application associated with the selected 1$^{st}$ home screen. The user is then informed of a position of the found application relative to its respective home screen. This process is described in FIG. 15 and FIG. 16.

In accordance with one embodiment, the home screens are displayed as multiple pages or thumbnails within a standby screen 300. The home screens may, for example, be ones that correspond to different operating systems provided to the mobile terminal 100.

For example, FIG. 16(a) shows that an initial 1$^{st}$ page 310 is displayed on a home screen having a plurality of pages. If a user inputs a command for representing the entire pages of the home screen as thumbnails, referring to FIG. 16(b), the controller 180 configures the entire pages 310, 320, 330 and 340 as thumbnails and then displays the configured thumbnails. In doing so, for example, the thumbnail display command can include a user's pinching-in multi-touch shown in FIG. 16(a). In this case, the pinching-in multi-touch may include the case where a touch is performed in a manner of gradually decreasing a distance between $1^{st}$ and $2^{nd}$ points which are being multi-touched on the $1^{st}$ page 310 of the home screen.

Referring to FIG. 16(c), while the thumbnails 310, 320, 330 and 340 are displayed, if a pinching-out multi-touch is input by a user, the controller 180 stops displaying the thumbnails 310, 320, 330 and 340 and then re-displays the $1^{st}$ page 310 of the home screen. In this case, the pinching-in multi-touch includes the case where a touch performed in a manner of gradually decreasing a distance between $1^{st}$ and $2^{nd}$ points which are being multi-touched on the $1^{st}$ page 310 of the home screen having the thumbnails 310, 320, 330 and 340 displayed thereon.

Referring to FIG. 15(a) and FIG. 15(b), if the $1^{st}$ home screen 310 is selected from the home screens 310, 320, 330 and 340, the controller 180 searches the applications contained in the $2^{nd}$ to $4^{th}$ home screens 320, 330 and 340 for at least one application 321 associated with the selected $1^{st}$ home screen 310.

In this case, the application 321 associated with the $1^{st}$ home screen 310 can include an application having a category function associated with the $1^{st}$ home screen 310. And, the application 321 associated with the $1^{st}$ home screen 310 can include an application having a category function in common to the applications contained in the $1^{st}$ home screen 310.

If at least one application 321 associated with the $1^{st}$ home screen 310 is found, referring to FIG. 15(c), the controller 180 is able to control the application 321 to be displayed differently from other applications in terms of display style using, for example, the process described with reference to FIG. 7 in order for a position of the found application 321 to be identifiable. In doing so, FIG. 15 shows that the found application 321 is contained in the $2^{nd}$ home screen 320. The controller 180 controls the $2^{nd}$ home screen to be displayed by being identifiable from other home screens as well as the found application 321.

Thereafter, if a long-touch (or other designating) input is applied to the $1^{st}$ home screen 310, the controller 180 recognizes that the long-touch input is a command for searching for the application 321 associated with the $1^{st}$ home screen 310 and then controls the application 321 to be displayed differently from other applications in terms of display style in order for a position of the found application 321 to be identifiable.

Referring to FIG. 15(b) and FIG. 15(c), if the $1^{st}$ application 311 in the $1^{st}$ home screen 310 is selected, the controller 180 searches the applications contained in the rest of the home screens 320, 330 and 340 for at least one application 321 associated with the selected $1^{st}$ application 311.

If at least one application 321 associated with the $1^{st}$ home screen 310 is found, referring to FIG. 15 (c), the controller 180 controls the application 321 to be displayed differently from other applications in terms of display style using, for example, the process described with reference to FIG. 7 in order for a position of the found application 321 to be identifiable.

Meanwhile, in the same manner of the process described with reference to FIG. 9, the controller 180 displays a position information 251 indicating a position of the found application 321 in a vicinity of the selected $1^{st}$ home screen 310 or the selected $1^{st}$ application 311. When the position information 251 is selected, the controller 180 controls the found application 321 and/or the $2^{nd}$ home screen having the found application 321 belong thereto to be identifiably displayed.

And, using, for example, the process described with reference to FIG. 10, the controller 180 displays guide information for guiding a selection of the $2^{nd}$ home screen 320 containing the found application 321. When the $2^{nd}$ home screen 320 is selected in response to the guide information, the controller 180 controls the application 321 to be identifiably displayed within the $2^{nd}$ home screen 320.

Moreover, using, for example, the process described with reference to FIG. 11, the controller 180 displays the found application 321 by shifting the found application 321 into or in a vicinity of the $1^{st}$ home screen 310 temporarily. The controller also displays information indicating a position of the $2^{nd}$ home screen 320 on which the application 321 is situated. When the temporarily shifted application 321 is selected, the controller 180 shifts the application 321 which was situated on the $2^{nd}$ home screen 320 into the $1^{st}$ home screen 310.

In the above description, the steps S130 to S150 shown in FIG. 3 are explained with reference to FIGS. 7 to 16. In the following description, the steps S160 to S200 are explained in continuation with the former step.

In accordance with steps S110 to S150 and the processes shown in FIGS. 4 to 16, while the position of the $2^{nd}$ content associated with the selected $1^{st}$ content is identifiably controlled, the controller 180 detects whether a command for editing the position-identified $2^{nd}$ content by at least one system is inputted from a user [S160].

In particular, if the position-identified $2^{nd}$ content is selected by the user or is touched by a preset system, the controller 180 recognizes the selection or touch as the command for editing the $2^{nd}$ content [S170], pages an editing UI for providing at least one editing function for the $2^{nd}$ content, and then displays the paged editing UI [S180].

In this case, the editing UI can include a grouping function between the $2^{nd}$ content and the $1^{st}$ content associated with the $2^{nd}$ content, a function of deleting the $2^{nd}$ content, a function of executing the $2^{nd}$ content, a function of transmitting the $2^{nd}$ content, a function of updating the $2^{nd}$ content and the like.

If an editing function of at least one system is selected via the editing UI [S190], the controller 180 controls the selection function to be reflected by the $2^{nd}$ content [S200].

In the following description, the steps S160 to S200 are explained in detail with reference to FIGS. 17 to 23. FIG. 17(a) shows that a position of an application 'Avi player' 223 associated with an application 'Movie' 221 selected by a user by the aforesaid steps S110 to S160 and the process shown in FIG. 12 is identifiably displayed. The content of displaying the position of the application 'Avi player' 223 identifiably in FIG. 17 (a) can be replaced by the content of displaying the position of the application 'Avi player' 223 identifiably in one of FIGS. 7 to 12, FIG. 14 or FIG. 15.

If the application 223 'Avi player' 223, of which position is identifiably displayed, is selected by a preset system, the controller 180 recognizes the selection as a command for editing the application 'Avi player' 223 and then pages and displays an editing UI 400 for providing various editing functions 410, 420, 430, 440, 450 and 460 for the application 'Avi player' 223 [FIG. 17 (b)].

In this case, the editing UI 400 includes a $1^{st}$ editing function 410 of grouping the application 'Avi player' 223 into a group 'Multimedia category' 242B having the application 'Movie' 221 belong thereto, a $2^{nd}$ editing function 420 of grouping the application 'Movie' 221 and the application 'Avi player' 223 into a new group, a $3^{rd}$ editing function 430 of deleting the application 'Avi player' 223, a $4^{th}$ editing function of executing the application 'Avi player' 223, a 5$^{th}$ editing function 450 of transmitting the application 'Avi player' 223 to a third party, and a 6$^{th}$ function 460 of updating the application 'Avi player' 223.

Of course, the 1$^{st}$ to 6$^{th}$ editing functions 410, 420, 430, 440, 450 and 460 are described for example. And, any editing function of editing the application 'Avi player' 223 can be included in the editing UI 400.

The 1$^{st}$ to 6$^{th}$ editing functions 410, 420, 430, 440, 450 and 460 in the editing UI 400 can be individually executed after the steps S110 to S150 shown in FIG. 3. In particular, without displaying the editing UI 400 after the steps S110 to S150, the controller 180 is able to control an operation of at least one of the 1$^{st}$ to 6$^{th}$ editing functions 410, 420, 430, 440, 450 and 460 in accordance with a user manipulation.

FIG. 18 shows a process for executing the 1$^{st}$ editing function 410 in the editing UI 400. Referring to FIG. 18(*a*), if the 1$^{st}$ editing function 410 is selected from the editing UI 400, the controller 180 groups the application 'Avi player' 223, of which position is identifiably displayed, into the category group 'Multimedia' 242B and displays the application 'Movie' 221 by shifting it into the category group 'Multimedia' 242B as show in FIG. 18 (*b*).

Figure 19:
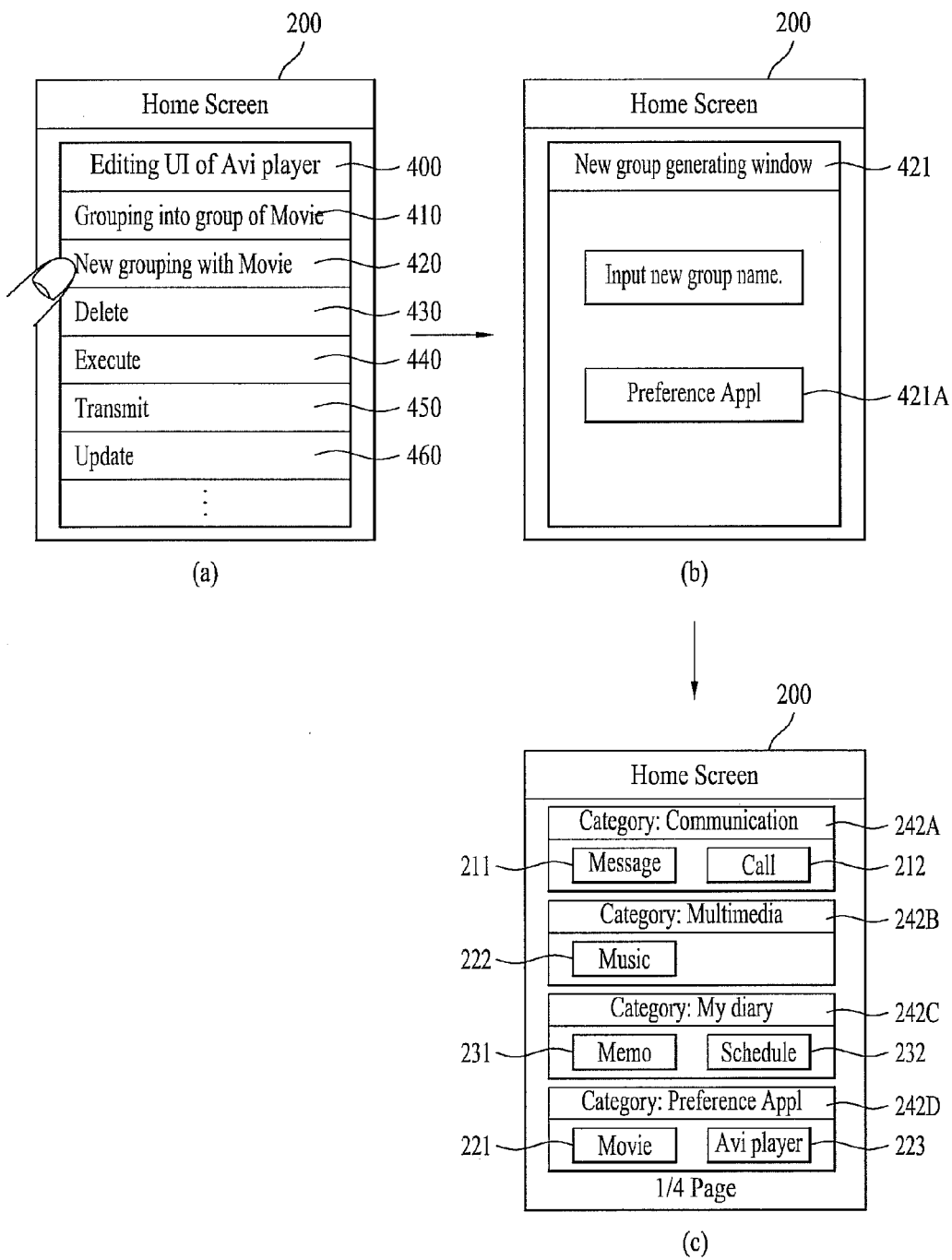

FIG. 19 shows a process for executing the 2$^{nd}$ editing function 420 in the editing UI 400. Referring to FIG. 19(*a*), if the 2$^{nd}$ editing function 420 is selected from the editing UI 400, the controller 180 displays a new group generating window 421 for generating a new group including the application 'Avi player' 223 and the application 'Movie' 221 as shown in FIG. 19 (*b*).

If a new group name 'Preference Appl' 421A is input via the new group generating window 421, the controller 180 generates and displays a new group 'preference Appl' 242D including the application 'Avi player' 223 and the application 'Movie' 221 [FIG. 19 (*c*)].

FIG. 20 shows a process for executing the 3rd editing function 430 in the editing UI 400. Referring to FIG. 20(*a*), if the 3rd editing function 430 is selected from the editing UI 400, the controller 180 deletes the icon corresponding to the application 'Avi player' 223, of which position is identifiably displayed, from the home screen 200 as shown in FIG. 20 (*b*).

FIG. 21 shows a process for executing the 4th editing function 440 in the editing UI 400. Referring to FIG. 21(*a*), if the 4th editing function 440 is selected from the editing UI 400, the controller 180 executes the application 'Avi player' 223 and displays an executed screen of the application 'Avi player' 223 as shown in FIG. 21 (*b*).

Figure 22:
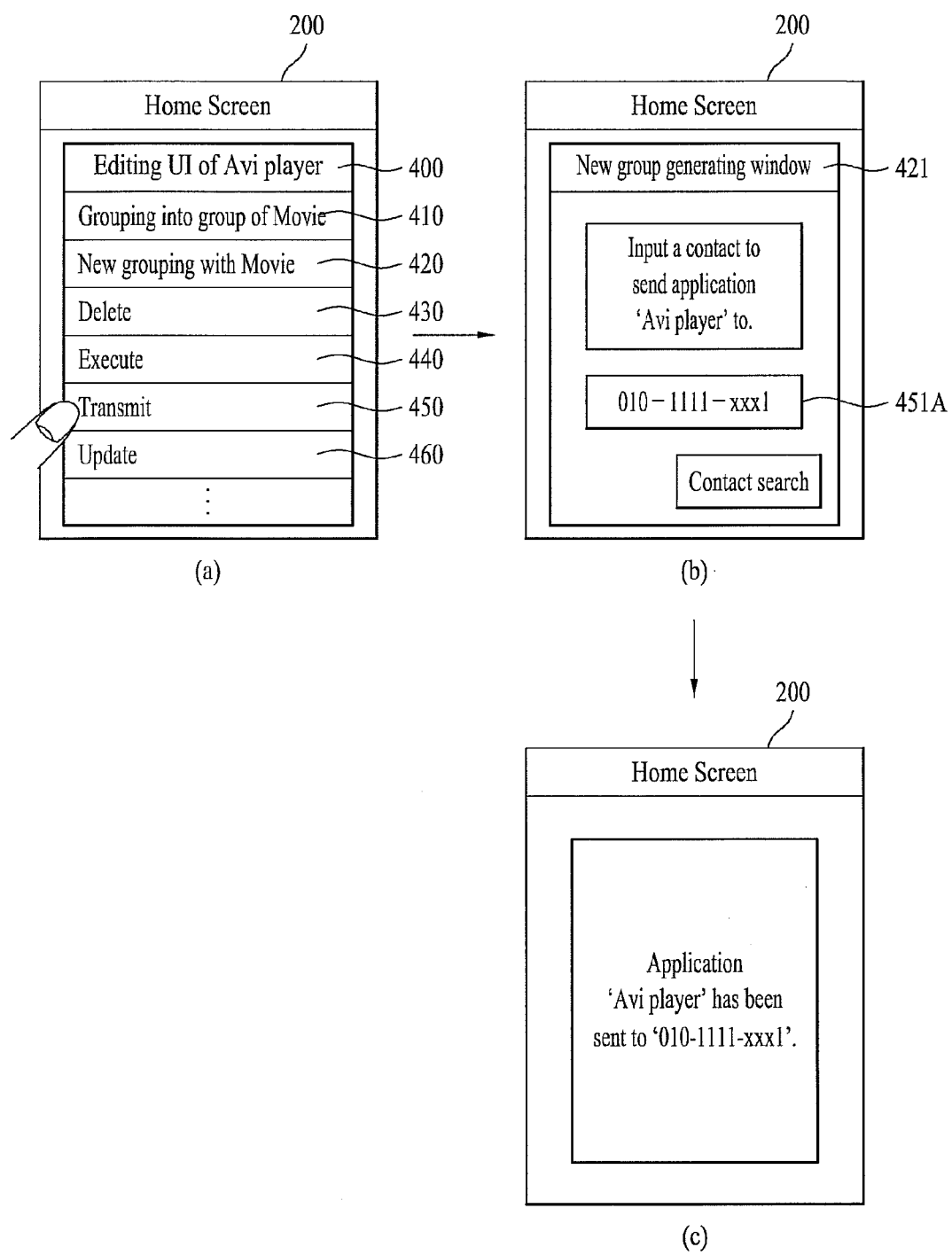

FIG. 22 shows a process for executing the 5th editing function 450 in the editing UI 400. Referring to FIG. 22(*a*), if the 5th editing function 410 is selected from the editing UI 400, the controller 180 displays a contact setting window 451 for transmitting the application 'Avi player' 223 as shown in FIG. 22 (*b*).

If a contact 451A of a counterpart, to which the application 'Avi player' 223 will be transmitted' is set via the contact setting window 451, the controller 180 controls the wireless communication unit 110 to transmit the application 'Avi player' 223 to the set contact 451A of the counterpart [FIG. 22 (*c*)]. In this case, the contact 451A of the counterpart is directly inputted by a user or can be selected from a phonebook displayed in accordance with a contact search request.

Figure 23:
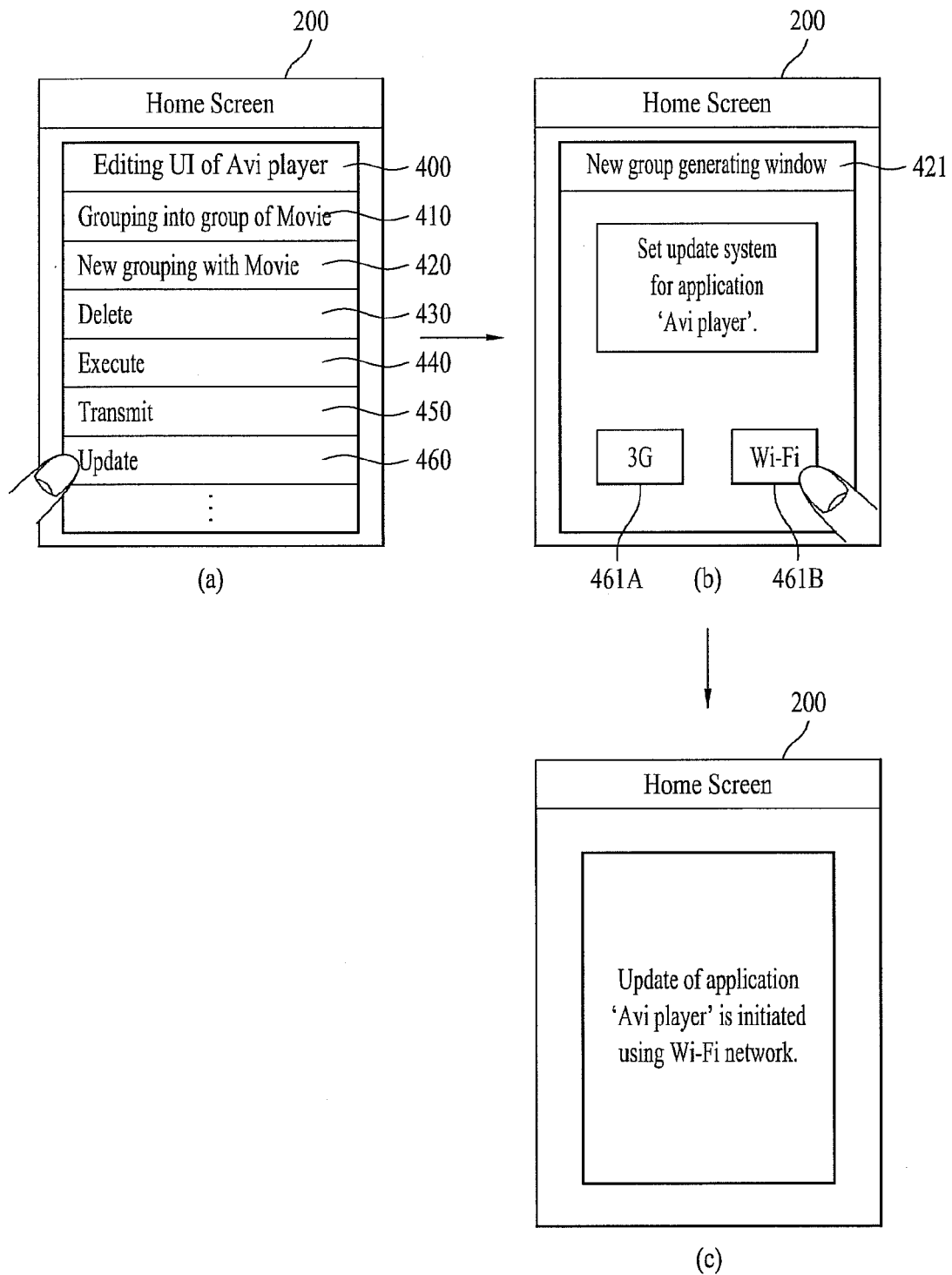

FIG. 23 shows a process for executing the 6th editing function 460 in the editing UI 400. Referring to FIG. 23(*a*), if the 6th editing function 460 is selected from the editing UI 400, the controller 180 displays an update window 461 for setting an update system of the application 'Avi player' 223 as shown in FIG. 23 (*b*). In this case, the update system can include, for example, 3G system (chargeable) 461A for an update via a mobile communication network provided by a mobile communication service provider or Wi-Fi system (free of charge) 461B for an update via wireless internet, or another system. Once one 461B of the update systems 461A and 461B is set via the update setting window 461, the controller 180 may control the wireless communication unit 110 to initiate an update of the application 'Avi player' 223 as shown in FIG. 23 (*c*).

One or more embodiments described herein therefore may inform a user of an identifiable position of 2nd content associated with 1st content currently selected from a content list, thereby enabling the user to quickly identify the 2nd content selected by the user from the content list containing a lot of contents.

One or more embodiments may also provide a function of grouping 2nd content into a group of 1st content, thereby enabling a user to efficiently manage the content list containing many contents. This may be accomplished by grouping the 2nd content, which is missing from the group of the 1st content despite being associated with the 1st content, into the group of the 1st content.

One or more embodiments may also provide a function of grouping 1st and 2nd contents into a new group in the content list, to thereby enable a user to quickly generate a user-specific group in the content list.

In addition, the above-described embodiments may be implemented by code included in a program stored on a computer-readable medium. The computer-readable medium may include any kind of recording medium in which data readable by a computer system can be stored. Examples include ROM, RAM, CD-ROM, magnetic tapes, floppy discs, and optical data storage devices, as well as carrier-wave type implementations (e.g., transmission via Internet). The computer can include the controller 180 of the terminal, a computer, or other type of processor.

One or more embodiments also provide a mobile terminal and associated method by which a user is able to quickly search for and recognize 2nd content associated with a currently selected 1st content.

One or more embodiments also provide a mobile terminal and an associated method for managing contents by grouping 2nd content into a group of 1st content, if the 2nd content does not belong to the 1st content group.

One or more embodiments also provide a mobile terminal and associated method for managing contents by generating a new group from as a result of grouping 1st content and associated 2nd content together that were not previously grouped in a same screen.

In accordance with one embodiment, a mobile terminal includes a memory provided with at least two contents, a display unit displaying the at least two contents on a screen, and a controller, if at least one 1st content is selected from the screen, searching the memory for at least one 2nd content associated with the at least one 1st content, the controller controlling a position of the found at least one 2nd content to be identified.

In accordance with another embodiment, a method of controlling a mobile terminal includes displaying at least two contents on a screen of a display unit, if a specific 1st content is selected, searching the at least two contents for at least one 2nd content associated with the selected 1st content, and controlling a position of the found at least one 2nd content to be identified.

In accordance with another embodiment, a terminal comprises a display, at least one storage area to store first content and second content; and a controller to identify the second content after the first content is selected and to control display information corresponding to the second content after the second content is identified, wherein the controller identifies the second content based on a search of stored information and wherein the first content and the second content share at least one common feature. The first content and the second content may be different applications to be performed by the terminal, and/or may be different functions to be performed by the terminal.

The information corresponding to the second content may be one of an icon, text, image, or graphical object, the controller may control a display location of the information corresponding to the second content after the second content is identified, and/or the controller may change an appearance of the displayed information corresponding to the second content after the second content is identified.

The information corresponding to the first and second content may be simultaneously displayed on a same screen, the controller may not change an appearance of the displayed information corresponding to the first content after the appearance of the displayed information corresponding to the second content is changed.

Also, the controller may display new information on a same screen as the information corresponding to the second content after the second content is identified. The new information may include a pop-up window including a message indicating that the second content and the first content share the at least one common feature.

Also, the at least one common feature may be one of a same category of subject matter or a same type of function to be performed on the terminal.

Also, information corresponding to the first content may be included in a first screen and the information corresponding to the second content is included in a second screen, and the second screen may be automatically displayed after the second content is identified. The first and second screens may be simultaneously displayed after the second content is identified and also may be simultaneously displayed before the first content is selected.

Also, the controller may control display of the information corresponding to the second content with display of information corresponding to the first content in a group after the second content is identified.

Also, the first content may be included in a first group of content and the second content may be included in a second group of content, and wherein the controller may display the information corresponding to the second content with display of information corresponding to the first content in the first group after the second content is identified.

Also, the first content may be included in a predetermined group of content and the second content may not be included in any predetermined group of content, and wherein the controller may display the information corresponding to the second content with display of information corresponding to the first content in the first group after the second content is identified.

The first and second content may correspond to different operating systems, and the terminal may be a stationary or mobile terminal.

In accordance with another embodiment, a terminal comprises a screen; at least one storage area to store a plurality of content; and a controller to display information corresponding to the plurality of content on the screen, wherein the controller controls display of options for displaying the information corresponding to the plurality of content and controls display of the information corresponding to the plurality of content differently based on a selected one of the options.

The information corresponding to first content may be displayed in a different group from information corresponding to the second option, and the list of options may include options for sorting first and second content differently. Moreover, the options may include an option to sort the plurality of content based on one of category of subject matter, alphabetic or other indexed order, or frequency of use of each of the plurality of content. The plurality of content may be different applications or functions to be performed by the terminal, and the information corresponding to the plurality of content is at least one of an icon, text, image, or graphical object. Also, the terminal may be a stationary or mobile terminal.

In accordance with another embodiment, a method for controlling a terminal comprises accessing at least one storage area that stores first and second content; receiving a signal selecting the first content; identifying the second content after the first content is selected; and controlling display of information corresponding to the second content after the second content is identified, wherein the second content is identified based on a search of information from the at least one storage area and wherein the first content and the second content share at least one common feature. The first and second content may be different applications or functions to be performed by the terminal, and the information corresponding to the second content may be one of an icon, text, image, or graphical object.

The method may also include changing an appearance of the displayed information corresponding to the second content after the second content is identified. The information corresponding to the first and second content may be simultaneously displayed on a same screen, and an appearance of the displayed information corresponding to the first content may not changed after the appearance of the displayed information corresponding to the second content is changed.

The method may also include displaying new information on a same screen as the information corresponding to the second content after the second content is identified. The new information may include a pop-up window including a message indicating that the second content and the first content share the at least one common feature, and the at least one common feature may be one of a same category of subject matter or a same type of function to be performed on the terminal.

Also, information corresponding to the first content may be included in a first screen and the information corresponding to the second content may be included in a second screen, and the second screen may be automatically displayed after the second content is identified. Also, the first and second screens may be simultaneously displayed after the second content is identified. Also, the first and second screens may be simultaneously displayed before the first content is selected.

The method may also include controlling display of the information corresponding to the second content with display of information corresponding to the first content in a group after the second content is identified. The first content may be included in a first group of content and the second content is included in a second group of content, and the information corresponding to the second content may be displayed with display of information corresponding to the first content in the first group after the second content is identified.

Also, the first content may be included in a predetermined group of content and the second content may not be included in any predetermined group of content, and the information corresponding to the second content may be displayed with display of information corresponding to the first content in the first group after the second content is identified.

Also, the first and second content may correspond to different operating systems, and the terminal may be a stationary or mobile terminal.

In accordance with another embodiment, a method for controlling a terminal comprises accessing at least one storage area that stores a plurality of content; displaying options for controlling display of information corresponding to the plurality of content; and controlling display of the information corresponding to the plurality of content differently based on a selected one of the options. The controlling operation may include displaying information corresponding to first content in a different group from information corresponding to the second option.

Also, the options may include options for sorting first and second content differently. The options may include an option to sort the plurality of content based on one of category of subject matter, alphabetic or other indexed order, or frequency of use of each of the plurality of content. The plurality of content may be different applications or functions to be performed by the terminal. The information corresponding to the plurality of content is at least one of an icon, text, image, or graphical object, and the terminal may be a stationary or mobile terminal.

In accordance with another embodiment, a computer-readable medium stores a program for controlling display of information on a terminal, the program including code for performing the any of the aforementioned methods.

The embodiments described herein have been explained with reference to a mobile terminal. However, the embodiments may also be applied to managing and displaying content and other information in other types of terminals. Examples include other types of mobile terminals as well as stationary terminals such as mobile phones, user equipment, smart phones, DTV, computers, digital broadcast terminals, personal digital assistants, portable multimedia players (PMP) and navigation systems.

As used herein, the suffixes "module," "unit," and "part" are used for facilitation of the detailed description of the present embodiment and are not intended to be construed as means-plus-function language when used in the claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with the features of one or more other embodiments to form additional embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

We claim:

1. A terminal, comprising:
   a display;
   at least one storage area to store first content and second content; and
   a controller to identify the second content after the first content is selected and to control display information corresponding to the second content after the second content is identified, wherein the controller identifies the second content based on a search of stored information and wherein the first content and the second content share at least one common feature.

2. The terminal of claim 1, wherein the first content and the second content are different applications to be performed by the terminal.

3. The terminal of claim 1, wherein the first content and the second content are different functions to be performed by the terminal.

4. The terminal of claim 1, wherein the information corresponding to the second content is one of an icon, text, image, or graphical object.

5. The terminal of claim 1, wherein the controller controls a display location of the information corresponding to the second content after the second content is identified.

6. The terminal of claim 1, wherein the controller changes an appearance of the displayed information corresponding to the second content after the second content is identified.

7. The terminal of claim 6, wherein information corresponding to the first and second content is simultaneously displayed on a same screen.

8. The terminal of claim 7, wherein the controller does not change an appearance of the displayed information corresponding to the first content after the appearance of the displayed information corresponding to the second content is changed.

9. The terminal of claim 6, wherein the controller displays new information on a same screen as the information corresponding to the second content after the second content is identified.

10. The terminal of claim 9, wherein the new information includes a pop-up window including a message indicating that the second content and the first content share the at least one common feature.

11. The terminal of claim 1, wherein the at least one common feature is one of a same category of subject matter or a same type of function to be performed on the terminal.

12. The terminal of claim 6, wherein information corresponding to the first content is included in a first screen and the information corresponding to the second content is included in a second screen.

13. The terminal of claim 12, wherein the second screen is automatically displayed after the second content is identified.

14. The terminal of claim 12, wherein the first and second screens are simultaneously displayed after the second content is identified.

15. The terminal of claim 14, wherein the first and second screens are simultaneously displayed before the first content is selected.

16. The terminal of claim 1, wherein the controller controls display of the information corresponding to the second content with display of information corresponding to the first content in a group after the second content is identified.

17. The terminal of claim 1, wherein the first content is included in a first group of content and the second content is included in a second group of content, and wherein the controller displays the information corresponding to the second content with display of information corresponding to the first content in the first group after the second content is identified.

18. The terminal of claim 1, wherein the first content is included in a predetermined group of content and the second content is not included in any predetermined group of content, and wherein the controller displays the information corresponding to the second content with display of information corresponding to the first content in the first group after the second content is identified.

19. The terminal of claim 1, wherein the first and second content correspond to different operating systems.

20. The terminal of claim 1, wherein the terminal is a mobile terminal.

21. A method for controlling a terminal, comprising:
- accessing at least one storage area that stores first and second content;
- receiving a signal selecting the first content;
- identifying the second content after the first content is selected; and
- controlling display of information corresponding to the second content after the second content is identified, wherein the second content is identified based on a search of information from the at least one storage area and wherein the first content and the second content share at least one common feature.

* * * * *